United States Patent
Dittmann et al.

(10) Patent No.: US 11,708,289 B2
(45) Date of Patent: Jul. 25, 2023

(54) PROCESS FOR THE PRODUCTION OF AN OPTICAL ELEMENT FROM GLASS

(71) Applicant: Docter Optics SE, Neustadt an der Orla (DE)

(72) Inventors: Christoph Dittmann, Neustadt an der Orla (DE); Alexander Kuppe, Neustadt an der Orla (DE); Annegret Diatta, Neustadt an der Orla (DE); Ralf Polle, Neustadt an der Orla (DE); Toni Schnoor, Neustadt an der Orla (DE); Sven Fröhlich, Neustadt an der Orla (DE)

(73) Assignee: DOCTER OPTICS SE, Neustadt An der Orla (DE)

( * ) Notice: Subject to any disclaimer, the term of this patent is extended or adjusted under 35 U.S.C. 154(b) by 71 days.

(21) Appl. No.: 17/532,046

(22) Filed: Nov. 22, 2021

(65) Prior Publication Data
US 2022/0177345 A1 Jun. 9, 2022

(30) Foreign Application Priority Data
Dec. 3, 2020 (DE) ...................... 10 2020 132 239.9

(51) Int. Cl.
C03B 19/02 (2006.01)
F21S 41/25 (2018.01)
C03C 21/00 (2006.01)

(52) U.S. Cl.
CPC .......... *C03B 19/025* (2013.01); *C03C 21/007* (2013.01); *F21S 41/25* (2018.01)

(58) Field of Classification Search
None
See application file for complete search history.

(56) References Cited

U.S. PATENT DOCUMENTS

| | | |
|---|---|---|
| 821,610 A | 5/1906 | Cox |
| 4,666,496 A | 5/1987 | Fecik |
| 7,798,688 B2 | 9/2010 | Hamkens |
| 2003/0001301 A1 | 1/2003 | Duroux et al. |
| 2004/0244421 A1 | 12/2004 | Kato et al. |
| 2005/0054514 A1 | 3/2005 | Ishioka et al. |
| 2009/0323502 A1 | 12/2009 | Murata et al. |
| 2010/0246008 A1 | 9/2010 | Murata et al. |
| 2011/0266576 A1 | 11/2011 | Engl et al. |
| 2012/0040044 A1 | 2/2012 | Uehira et al. |

(Continued)

FOREIGN PATENT DOCUMENTS

| | | |
|---|---|---|
| CN | 105819674 | 8/2016 |
| DE | 2906858 | 9/1980 |

(Continued)

OTHER PUBLICATIONS

International Search Report and Written Opinion dated Apr. 8, 2021 for Corresponding Patent Application No. PCT/DE2020/101007.

(Continued)

*Primary Examiner* — Elmito Breval
(74) *Attorney, Agent, or Firm* — Duane Morris LLP

(57) ABSTRACT

The present disclosure relates to a method for producing an optical element (202), wherein a blank of transparent material is heated and/or provided and, after heating and/or after being provided between a first mold (UF) and at least one second mold (OF), is press molded to form the optical element (202), in particular on both sides, and is then sprayed with a surface treatment agent.

28 Claims, 32 Drawing Sheets

(56) References Cited

U.S. PATENT DOCUMENTS

| | | |
|---|---|---|
| 2013/0221551 A1 | 8/2013 | Genda |
| 2014/0332991 A1 | 11/2014 | Giessauf et al. |
| 2015/0224723 A1 | 8/2015 | Hamkens |
| 2017/0327402 A1 | 11/2017 | Fujii |
| 2019/0041556 A1 | 2/2019 | Iwata |

FOREIGN PATENT DOCUMENTS

| | | |
|---|---|---|
| DE | 69701714 | 2/2001 |
| DE | 10 2008 034153 | 1/2010 |
| DE | 102008054029 | 5/2010 |
| DE | 20 2014 100462 | 3/2014 |
| DE | 10 2015 001609 | 8/2016 |
| DE | 10 2020 115078 | 1/2021 |
| EP | 2402140 | 1/2012 |
| EP | 2666620 | 11/2013 |
| EP | 3312501 | 4/2018 |
| EP | 3520983 | 8/2019 |
| EP | 3575362 | 12/2019 |
| JP | H06-286754 | 10/1994 |
| JP | 2002160256 | 6/2002 |
| JP | 2006062359 | 3/2006 |
| JP | 2010046895 | 3/2010 |
| JP | 2018118900 | 8/2018 |
| JP | 2019135202 | 8/2019 |
| KR | 20160028901 | 3/2016 |
| WO | 2009/036739 | 3/2009 |
| WO | 2009/109209 | 9/2009 |
| WO | 2012072192 | 6/2012 |
| WO | 2017/207079 | 12/2017 |
| WO | 2019/072326 | 4/2019 |
| WO | 2021008647 | 1/2021 |
| WO | 2021008657 | 1/2021 |

OTHER PUBLICATIONS

International Preliminary Report on Patentability dated May 17, 2022 for Corresponding Patent Application No. PCT/DE2020/101007.
International Search Report and Written Opinion dated Jan. 26, 2021 for Corresponding Patent Application No. PCT/DE2020/100860.
International Preliminary Report on Patentability dated Apr. 12, 2022 For Corresponding Patent Application No. PCT/DE2020/100860.
Search Report dated Nov. 22, 2021 For Corresponding Patent Application No. DE 10 2021 105 560.1.
International Preliminary Report on Patentability dated Jul. 19, 2022 For Corresponding PCT Application No. PCT/DE2021/100035.
International Search Report and Written Opinion dated May 25, 2021 For PCT/DE2021/100136.
International Search Report and Written Opinion dated May 6, 2021 For PCT/DE2021/100035.
International Search Report and Written Opinion dated May 20, 2019 for Corresponding PCT Application No. PCT/DE2019/100249.
International Preliminary Report on Patentability dated Jan. 18, 2022 in Corresponding PCT Application No. PCT/DE2020/100478.
International Search Report and Written Opinion dated Sep. 16, 2020 in Corresponding PCT Application No. PCT/DE2020/100478.
Office Action dated Mar. 20, 2020 for Corresponding Patent Application No. DE 10 2019 119 040.1.
Office Action dated Feb. 19, 2020 for Corresponding Patent Application No. DE 10 2019 119 042.8.
International Preliminary Report on Patentability dated Jan. 18, 2022 in Corresponding PCT Application No. PCT/DE2020/100609.
International Search Report and Written Opinion dated Oct. 16, 2020 in Corresponding PCT Application No. PCT/DE2020/100609.
International Preliminary Report on Patentability dated Sep. 22, 2020 for Corresponding PCT Application No. PCT/DE2019/100249.
German Office Action dated Jul. 13, 2021 for Corresponding Patent Application No. DE 10 2020 127 638.9.
International Preliminary Report on Patentability Issued in Corresponding PCT Application No. PCT/DE2021/100136 dated Aug. 23, 2022.

A - A

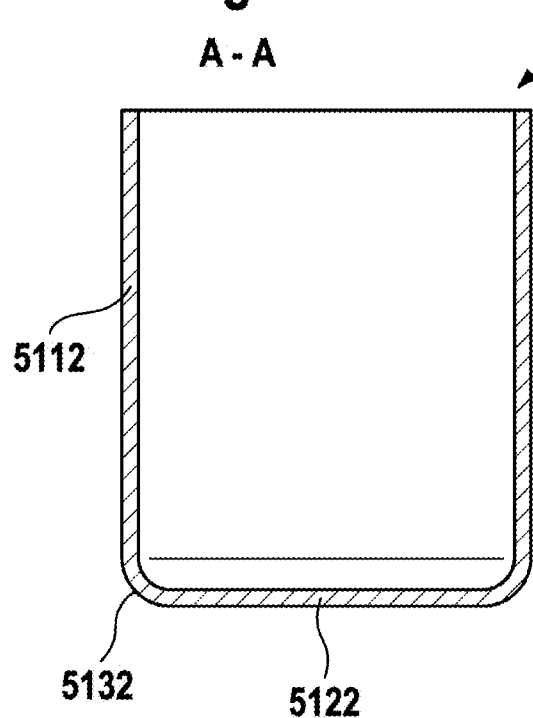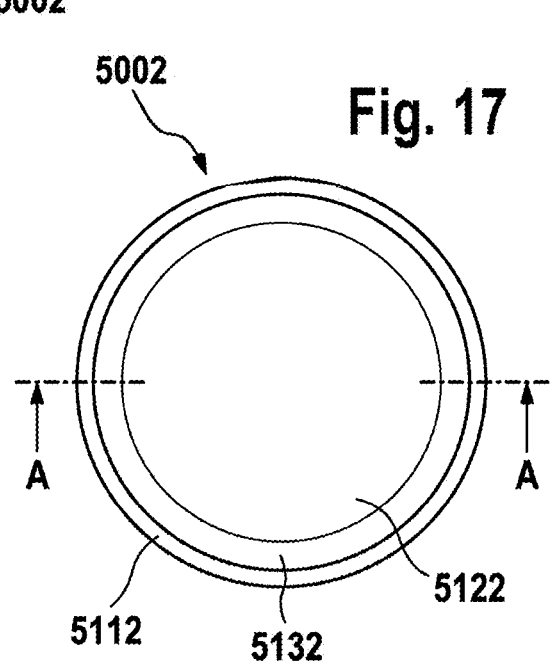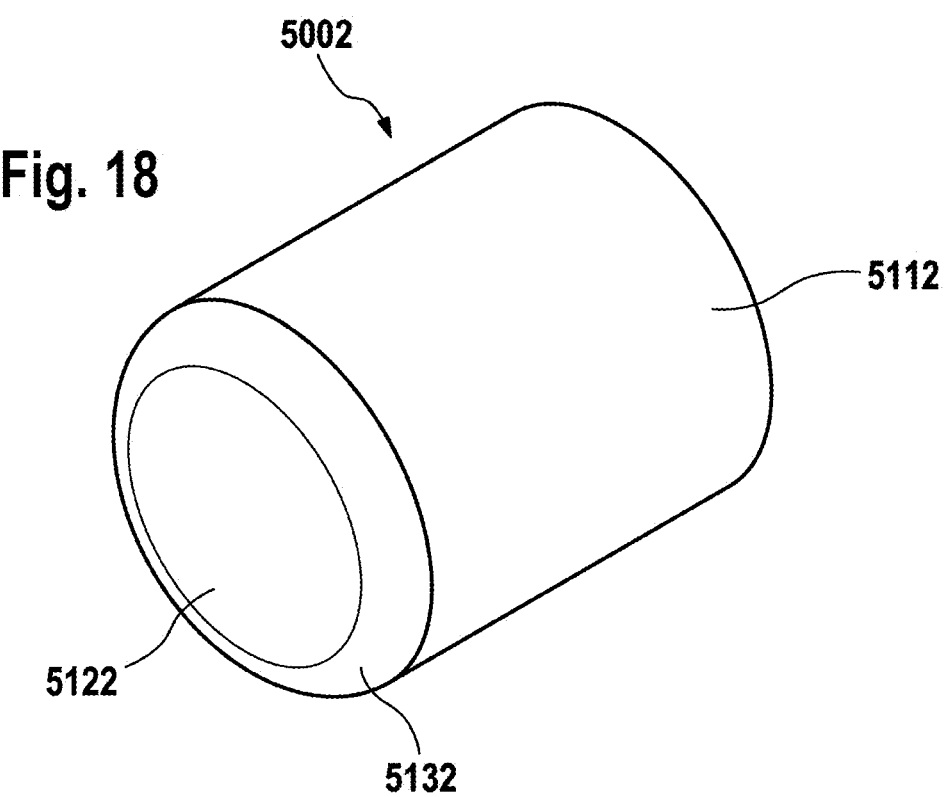

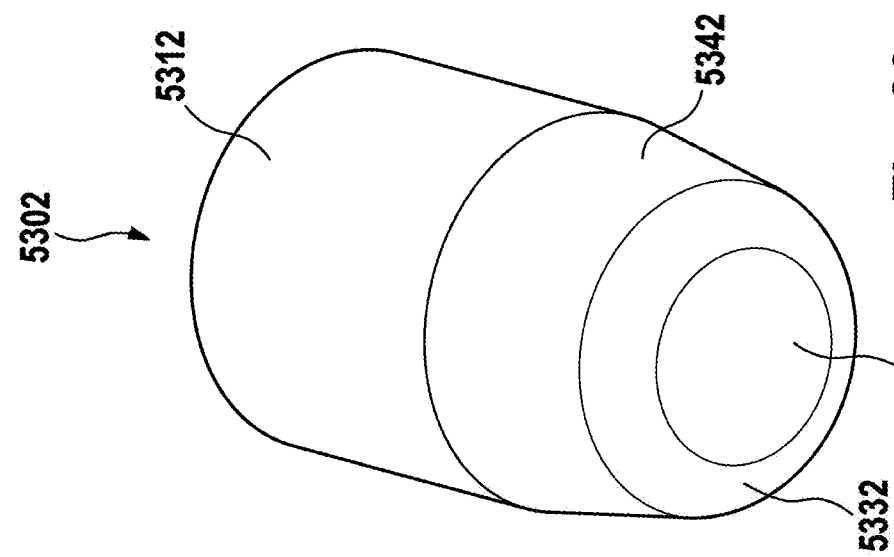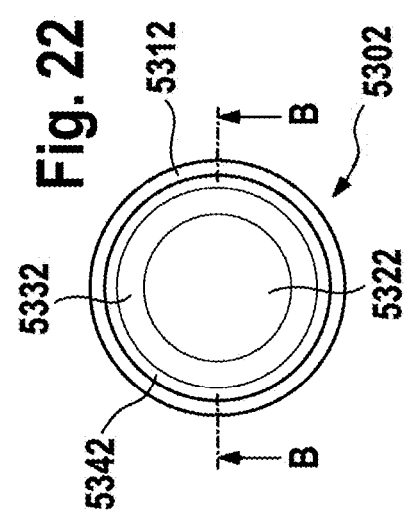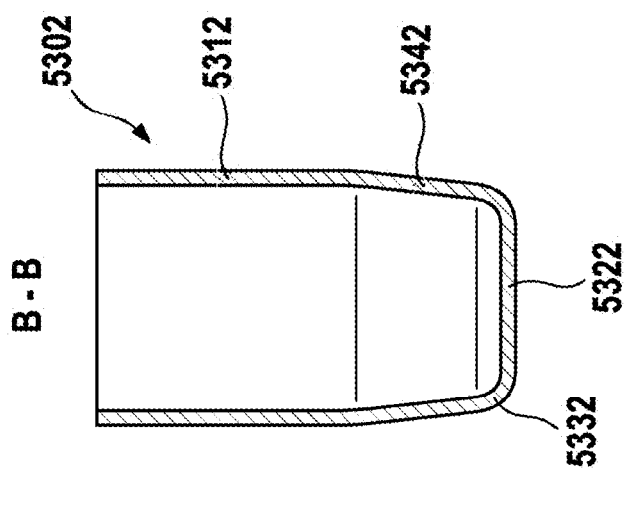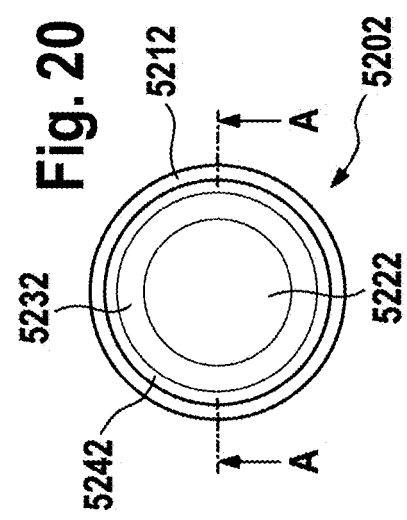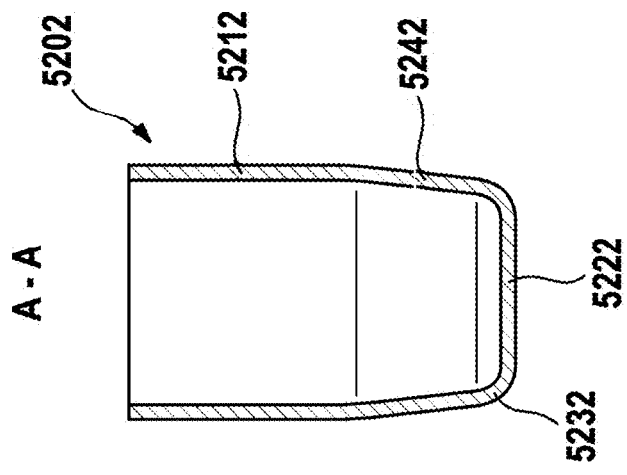

PROCESS FOR THE PRODUCTION OF AN OPTICAL ELEMENT FROM GLASS

PRIORITY CLAIM

The application claims the priority of the German patent application DE 10 2020 132 239.9, filed on 3 Dec. 2020, which is expressly incorporated by reference in its entirety.

FIELD OF THE INVENTION

The invention relates to a method for producing an optical element or headlight lens, wherein a blank made of glass or soda-lime glass is heated and/or provided and, after being heated and/or provided, is press-molded between a first mold and at least one second mold to form the optical element or headlight lens.

BACKGROUND

Press-molding methods are described in WO 2019/072325 A1 and WO 2019/072326 A1, for example.

In addition to particular contour accuracy and precise optical properties being required, the desire has developed for molding headlight lenses from borosilicate glass or glass systems similar to borosilicate glass, in order to obtain increased weather resistance and/or hydrolytic resistance (chemical resistance). Standards or evaluations methods for hydrolytic resistance (chemical resistance) are the Hella N67057 standard test and the climatic test/humidity-frost test, for example. High hydrolytic resistance is also classified as type 1, for example. In the light of the requirement for borosilicate-glass headlight lenses having corresponding hydrolytic resistance, the problem is posed of pressing headlight lenses from borosilicate glass or similar glass systems having the same hydrolytic resistance (chemical resistance). In a departure from this problem, an alternative method for producing an optical element or headlight lens from non-borosilicate glass and/or soda-lime glass is proposed.

U.S. Pat. No. 7,798,688 B2 discloses a projection headlight comprising a headlight lens and a light source, wherein a surface intended to face away from the light source of the projection headlight comprises a layer which has an aluminum concentration that is greater than an aluminum concentration inside the headlight lens.

DE 10 2006 034 431 A1 discloses a method for the surface-finishing of alkali-comprising glass, wherein hot surfaces are brought into contact with aluminum-chloride compounds from the vapour phase. According to DE 10 2006 034 431 A1, bringing the hot glass surfaces into contact with aluminum chloride dissolved in organic solvent, e.g. in methanol, results in improved surface properties. It is advantageous here for the contact between the glass surfaces and aluminum-chloride compounds from the vapour phase to take place at a reduced oxygen partial pressure. By contrast with the treatment from the vapour phase, in aqueous aluminum-chloride solutions, when in contact with a hot glass surface, high amounts of energy could be drawn from the glass surface in a short time due to the evaporation heat of the water on the glass surface, wherein side effects that occur, such as a reduction in strength and strain-induced damage to the surface, would result in unacceptable properties. In addition, organic solvents for aluminum chloride, such as methanol or ethanol, would be ruled out by a person skilled in the art, since they would considerably reduce the oxygen partial pressure due to their combustion, but oxygen would be required for incorporating the aluminum in the glass surface. In a departure from this knowledge, bringing the hot glass surface into contact with aluminum chloride dissolved in organic solvent, e.g. methanol, results in improved surface properties.

Compared with the surface treatment described in DE 10 2006 034 431 A1 for bottles comprising aluminum chloride and its solution in methanol, the teaching in EP 2 043 962 B1 sets out the need for a more durable surface when producing flat glass in a more efficient manner. This need is met in EP 2 043 962 B1 in that, when producing soda-lime-silica-based glass, the glass strip formed from the melt is transferred to an annealing furnace, wherein, before the annealing furnace, aluminum chloride is applied to the main surface of the glass strip at a temperature of between 540° C. and 850° C. by applying a mixture of $AlCl_3$ and at least one solvent to the surface of the glass strip, wherein the mixture comprises 5-10% aluminum chloride and the solvent comprises ethanol.

SUMMARY

The disclosure relates to a method for producing an optical element or headlight lens, wherein a blank made of glass or soda-lime glass is heated and/or provided and, after being heated and/or provided, is press-molded between a first mold and at least one second mold to form the optical element or headlight lens. In this case, it is provided that the optical element or headlight lens is sprayed with a spray mist, which is generated by means of a surface-treatment agent, comprising a solid dissolved in a solvent, and a gas.

BRIEF DESCRIPTION OF THE DRAWINGS

FIG. 16 is a cross section through the protective cover according to FIG. 14;

FIG. 17 is a view into the interior of the protective cover according to FIG. 14;

FIG. 18 is a perspective view of the protective cover according to FIG. 14;

FIG. 19 is a cross section through another protective cover;

FIG. 20 is a view into the interior of the protective cover according to FIG. 19;

FIG. 21 is a cross section through another protective cover;

FIG. 22 is a view into the interior of the protective cover according to FIG. 21;

FIG. 23 is a perspective view of the protective cover according to FIG. 21;

DETAILED DESCRIPTION

Figure 1:
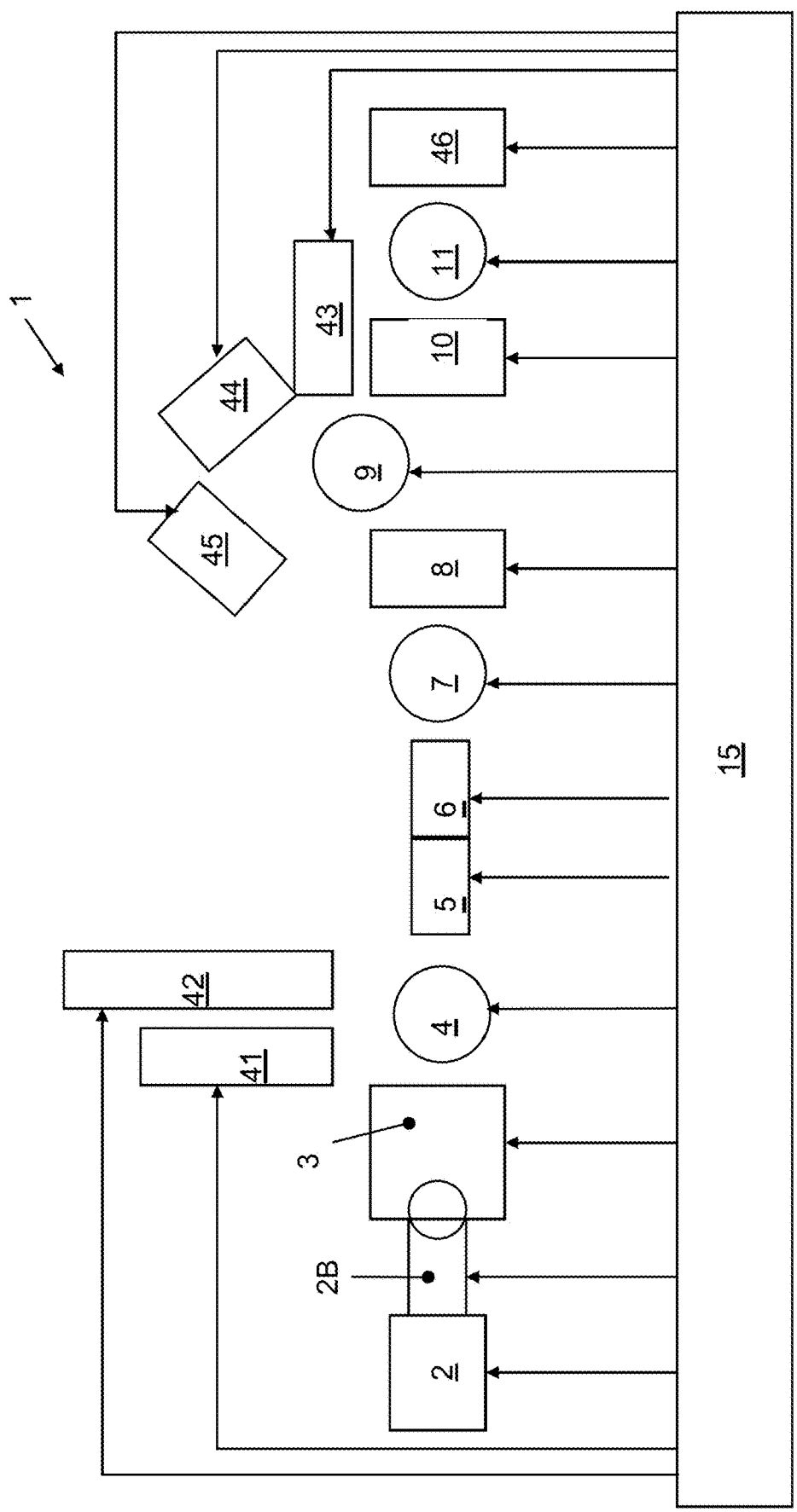
FIG. 1 is a schematic view of a device for producing motor-vehicle headlight lenses or lens-like free-forms for motor-vehicle headlights or optical elements made of glass.

The disclosure relates to a method for producing an optical element or headlight lens according to the claims, wherein it is provided, inter alia, that a blank made of non-borosilicate glass and/or soda-lime glass (soda lime silica glass) is heated and/or provided and, after being heated and/or provided, is press-molded, for example on both sides, between a first mold, for example for molding and/or press-molding a first optically active surface of the optical element, and at least one second mold, for example for molding and/or press-molding a second optically active surface of the optical element, to form the optical element, wherein the first optically active surface and/or the second optically active surface is sprayed with a surface-treatment agent (after the press-molding), wherein the surface-treatment agent comprises a solvent and a solid dissolved in the solvent, and wherein it is for example provided that the solvent or the solvent comprising the solid dissolved therein is thoroughly mixed with a gas and/or is dispersed by means of the gas.

Within the meaning of this disclosure, a solvent may optionally also be a solvent mixture. Within the meaning of this disclosure, a solvent or a solid dissolved in the solvent may optionally also be a solid mixture. Within the meaning of this disclosure, a gas may optionally also be a gas mixture.

By contrast with the treatment of hollow glass and flat glass disclosed in DE 10 2006 034 431 A1 and EP 2 043 962 B1, the present disclosure relates to the treatment of optically active surfaces. In this case, particularly high requirements are placed on the cooling, since not only mechanical damage, such as cracks, could result in the object becoming unusable, but also internal strain, due to excessively rapid cooling. Therefore, it is all the more surprising that hot optically active surfaces can be successfully treated in a suitable manner by misting or nebulizing a spray mist or by using a spray mist, in order to increase its hydrolytic resistance.

Within the meaning of this disclosure, soda-lime glass for example comprises
- 60 to 75 wt. % $SiO_2$ and
- 3 to 12 wt. % CaO, or
- 70 to 75 wt. % $SiO_2$ and
- 3 to 12 wt. % CaO.

Within the meaning of this disclosure, soda-lime glass for example comprises
- 60 to 75 wt. % $SiO_2$,
- 3 to 12 wt. % $K_2O$ and
- 3 to 12 wt. % CaO, or
- 70 to 75 wt. % $SiO_2$,
- 3 to 12 wt. % $K_2O$ and
- 3 to 12 wt. % CaO.

Within the meaning of this disclosure, soda-lime glass for example comprises
- 60 to 75 wt. % $SiO_2$,
- 3 to 12 wt. % $Na_2O$,
- 3 to 12 wt. % $K_2O$ and
- 3 to 12 wt. % CaO, or
- 70 to 75 wt. % $SiO_2$,
- 3 to 12 wt. % $Na_2O$,
- 3 to 12 wt. % $K_2O$ and
- 3 to 12 wt. % CaO.

Within the meaning of this disclosure, soda-lime glass for example comprises
- 0.2 to 2 wt. % $Al_2O_3$,
- 60 to 75 wt. % $SiO_2$,
- 3 to 12 wt. % $Na_2O$,
- 3 to 12 wt. % $K_2O$ and
- 3 to 12 wt. % CaO, Within the meaning of this disclosure, soda-lime glass for example comprises
- 0.2 to 2 wt. % $Al_2O_3$,
- 0.1 to 1 wt. % $Li_2O$,
- 60 to 75 wt. % $SiO_2$,
- 3 to 12 wt. % $Na_2O$,
- 3 to 12 wt. % $K_2O$ and
- 3 to 12 wt. % CaO, or
- 0.2 to 2 wt. % $Al_2O_3$,
- 0.1 to 1 wt. % $Li_2O$,
- 70 to 75 wt. % $SiO_2$,
- 3 to 12 wt. % $Na_2O$,
- 3 to 12 wt. % $K_2O$ and
- 3 to 12 wt. % CaO, Within the meaning of this disclosure, soda-lime glass for example comprises
- 0.2 to 2 wt. % $Al_2O_3$,
- 0.1 to 1 wt. % $Li_2O$,
- 0.3, for example 0.4, to 1.5 wt. % $Sb_2O_3$,
- 60 to 75 wt. % $SiO_2$,
- 3 to 12 wt. % $Na_2O$,
- 3 to 12 wt. % $K_2O$ and
- 3 to 12 wt. % CaO,
- such as DOCTAN®, or
- 0.2 to 2 wt. % $Al_2O_3$,
- 0.1 to 1 wt. % $Li_2O$,
- 0.3, for example 0.4, to 1.5 wt. % $Sb_2O_3$,
- 70 to 75 wt. % $SiO_2$,
- 3 to 12 wt. % $Na_2O$,
- 3 to 12 wt. % $K_2O$ and
- 3 to 12 wt. % CaO.

In one configuration, it is provided that the solid comprises aluminum, aluminum chloride, aqueous aluminum chloride, aluminum salt, fatty-acid aluminum salts, phosphate, potassium phosphate, sodium phosphate, KO2, KOH, KNO3, silicate, SiO2, potassium silicate and/or potassium, or consists of one or more of these constituents.

In another exemplary configuration, it is provided that the solvent comprises water, suspension agents, alcohol, methanol, ethanol, carbon-based solvents and/or isopropanol or consists of one or more of these constituents.

In another exemplary configuration, it is provided that the gas comprises air, nitrogen, hydrogen, carbon dioxide, HF, HCl and/or SO2 or consists of one or more of these constituents.

In another exemplary configuration, it is provided that the first optically active surface is exposed to a different surface-treatment agent from the second optically active surface.

In this case, it is for example provided that the optically active surface provided as a light entry surface is exposed to a surface-treatment agent of which the proportion of silicate, potassium silicate and/or KOH is greater than that of the surface-treatment agent to which the optically active surface provided as a light exit surface is exposed.

It may be provided that at least one optically active surface is fire-polished before the treatment with surface-treatment agent. In one configuration, it is for example provided that only the underside is fire-polished. This is, for example, provided in connection with a configuration of the lower optically active surface as a planar surface. It has been found to be suitable, when fire polishing is provided, for a waiting time to be allowed to elapse before the surface is exposed to the surface-treatment agent. The waiting time is for example at least two seconds, for example at least three seconds, for example at least four seconds. In one configuration, the fire polishing lasts no longer than three seconds, for example no longer than two seconds. For large lenses, waiting times or hold times may for example be at least 20 seconds but, for example, no more than 50 seconds.

Within the meaning of this disclosure, the surface-treatment agent for example comprises aluminum, aluminum powder having a particle size of 100 µm, aluminum powder having a particle size of ≤85 µm, aluminum powder having a particle size of ≤65 µm (cf. also DE 10 2012 019 985 B4).

According to one embodiment, the surface-treatment agent comprises, based on the total mass of the surface-treatment agent, 25 to 65 wt. % (for example 35 to 55 wt. %) water, 30 to 70 wt. % (for example 40 to 60 wt. %) potassium phosphate, 1 to 8 wt. % (for example 2 to 6 wt. %) sodium phosphate and 0.001 to 0.010 wt. % (for example 0.002 to 0.006 wt. %) aluminum, wherein the constituents do not add up to more than 100%. In another embodiment, the surface-treatment agent comprises, based on the total mass of the surface-treatment agent, 35 to 65 wt. % or 25 to 55 wt. % water. According to another embodiment, the surface-treatment agent comprises 40 to 70 wt. % or 30 to 60 wt. % potassium phosphate. In another embodiment, the surface-treatment agent comprises 2 to 8 wt. % or 1 to 6 wt. % sodium phosphate. According to another embodiment, the surface-treatment agent comprises 0.002 to 0.010 wt. % or 0.001 to 0.006 wt. % aluminum.

In an exemplary configuration, the first optically active surface and the second optically active surface are sprayed with the surface-treatment agent at least partially simultaneously (overlapping in time).

In another exemplary configuration, the temperature of the optical element and/or the temperature of the first optically active surface and/or the temperature of the second optically active surface during spraying with surface-treatment agent is no less than TG or TG+20 K, wherein TG denotes the glass transition temperature. In another configuration, the temperature is no less than TG-50 K.

In another exemplary configuration, the temperature of the optical element and/or the temperature of the first optically active surface and/or the temperature of the second optically active surface during spraying with surface-treatment agent is no greater than TG+150 K, for example no greater than TG+100 K. By contrast with the high temperatures described in EP 2 043 962 B1, the yield could be improved at lower temperatures below TG+100 K (but above TG), and therefore this temperature range is particularly suitable for the surface treatment in the above-mentioned sense as part of industrial manufacturing.

In another exemplary configuration, the surface-treatment agent in the form of a spray agent is sprayed onto the optically active surface, wherein the surface-treatment agent forms droplets, of which the size and/or the average size and/or the diameter and/or the average diameter is no greater than 50 µm.

In another exemplary configuration, the surface-treatment agent in the form of a spray agent is sprayed onto the optically active surface, wherein the surface-treatment agent forms droplets, of which the size and/or the average size and/or the diameter and/or the average diameter is no less than 10 µm.

In another exemplary configuration, the surface-treatment agent is sprayed so as to be mixed with compressed air. In another exemplary configuration, compressed air, for example in combination with a mixing nozzle or dual-substance nozzle, is used for generating a spray mist for the surface-treatment agent. In another exemplary configuration, the surface-treatment agent is sprayed so as to be mixed with gas. In an exemplary configuration, a gas or gas mixture (for example in combination with a pressure of at least two bar), for example in combination with a mixing nozzle or dual-substance nozzle, is used for generating a spray mist for the surface-treatment agent. The gas is mixed with the surface-treatment agent under pressure (e.g. at least two bar or at least three bar), for example. The gas is, for example, mixed with the gas (immediately) before impinging on the optically active surface. In one configuration, the gas may be or contain nitrogen and/or carbon dioxide.

In another exemplary configuration, the optically active surface is sprayed with the surface-treatment agent before the optical element is cooled in a cooling path for cooling in accordance with a cooling regime.

It is for example provided that residues are removed, for example washed away, from the surface-treatment process. This may for example be carried out using water, without the addition of cleaning agents. After being treated with the surface-treatment agent, the optical elements may have a (white) deposit, for example the reaction product. DI water may for example be used for cleaning the optical elements. DI water is demineralized water. The abbreviation DI stands for "deionized". The cleaning may for example be carried out at a water temperature of 60° C. of the DI water. It is not necessary to use a washing agent such as CEROWEG, which is known from WO 2019 243 343 A1.

It is for example provided that the optical element or lens has a transmission of greater than 90% after washing and/or removing residues from the surface-treatment process.

In another exemplary configuration, an optically active surface is sprayed with the surface-treatment agent for no longer than 4 seconds. Here, an optically active surface is sprayed with the surface-treatment agent for example for no longer than 3 seconds, for example for no longer than 2 seconds, for example for no longer than one second. In this process, the optically active surface is sprayed until it has been sprayed with no less than 0.05 ml surface-treatment agent and/or with no more than 0.5 ml, for example 0.2 ml, surface-treatment agent.

It is for example provided that, after being sprayed with surface-treatment agent, the headlight lens consists of at least 90%, for example at least 95%, for example (substantially) 100%, quartz glass on the surface. It is for example provided that the following is applicable in relation to the oxygen bonding to silicon on the surface of the headlight lens or the optical element $$\frac{Q(4)}{Q(4)+Q(3)} \geq 0.9$$

for example $$\frac{Q(4)}{Q(4)+Q(3)} \geq 0.95$$

In the above, Q(3) and Q(4) denote the crosslinking of the oxygen ions with the silicon ion, wherein 3 oxygen ions (Q(3)) or 4 oxygen ions (Q(4)) are arranged at the tetrahedron corners of the silicon ion. The proportion of quartz glass decreases towards the interior of the headlight lens or optical element, wherein, at a depth (distance from the surface) of 5 µm, it is for example provided that the proportion of quartz glass is at least 10%, for example at least 5%. It is for example provided that the following is applicable in relation to the oxygen bonding to silicon of the headlight lens or the optical element at a depth of 5 µm $$\frac{Q(4)}{Q(4)+Q(3)} \geq 0.1$$

for example $$\frac{Q(4)}{Q(4)+Q(3)} \geq 0.05$$

It is for example provided that the proportion of quartz glass at a depth (distance from the surface) of 5 µm is no greater than 50%, for example no greater than 25%. It is for example provided that the following is applicable in relation to the oxygen bonding to silicon of the headlight lens or the optical element at a depth of 5 µm $$\frac{Q(4)}{Q(4)+Q(3)} \geq 0.5$$

for example $$\frac{Q(4)}{Q(4)+Q(3)} \geq 0.25$$

It may be provided that the concentration of sodium ions in the interior of the lens is (additionally) higher than in the region close to the surface. Within the meaning of this disclosure, "close to the surface" may mean a depth of no greater than 5 μm, for example. It may be provided that the concentration of aluminum ions in the interior of the lens is (additionally) lower than in the region close to the surface. It may be provided that, during the treatment with surface-treatment agent, ion exchange takes place to some extent between ions in the glass or its region close to the surface and the surface-treatment agent.

In another exemplary configuration, the first mold is moved by means of an actuator for moving the first mold by the first mold and the actuator being connected by means of a first movable guide rod and at least one second movable guide rod, for example at least one third movable guide rod, wherein the first movable guide rod is guided in a recess in a fixed guide element and the second movable guide rod is guided in a recess in the fixed guide element and the optional third movable guide rod is guided in a recess in the fixed guide element, wherein it is for example provided that the deviation in the position of the mold orthogonally to the movement direction of the mold from the target position of the mold orthogonally to the movement direction of the mold is no greater than 20 μm, for example no greater than 15 μm, for example no greater than 10 μm.

In another exemplary configuration, the at least one second mold is moved by means of an actuator for moving the second mold in a frame, which comprises a first fixed guide rod, at least one second fixed guide rod and for example at least one third guide rod, wherein the first fixed guide rod, the at least one second fixed guide rod and the optional at least one third guide rod are connected at one end by an actuator-side fixed connector and at the other end by a mold-side fixed connector, wherein the at least one second mold is fixed to a movable guide element, which comprises a recess through which the first fixed guide rod is guided, another recess through which the at least one second fixed guide rod is guided, and optionally another recess through which the optional third fixed guide rod is guided, wherein it is for example provided that the deviation in the position of the mold orthogonally to the movement direction of the mold from the target position of the mold orthogonally to the movement direction of the mold is no greater than 20 μm, for example no greater than 15 μm, for example no greater than 10 μm.

In an exemplary configuration, it is for example provided that the first mold is moved by means of an actuator for moving the first mold by the first mold and the actuator for moving the first mold being connected by means of a first movable guide rod and at least one second movable guide rod, for example at least one third movable guide rod, wherein the first movable guide rod is guided in a recess in a fixed guide element and the second movable guide rod is guided in a recess in the fixed guide element and the optional third movable guide rod is guided in a recess in the fixed guide element.

In another exemplary configuration, it is provided that the fixed guide element is identical to the mold-side fixed connector or is indirectly or directly fixed thereto.

In another exemplary configuration, the first mold is a lower mold and/or the second mold is an upper mold.

In an exemplary configuration, it is provided that, before pressing, the blank is placed onto an annular or free-form support surface of a carrier body having a hollow cross section, and is heated on the carrier body, for example such that a temperature gradient is produced in the blank such that the blank is cooler in its interior than on its outer region. It is for example provided that the support surface is cooled by means of a coolant flowing through the carrier body, wherein it is for example provided that the support surface spans a base surface that is not circular. In this case, a geometry of the support surface or a geometry of the base surface of the support surface is for example provided which corresponds to the geometry of the blank (to be heated), wherein the geometry is selected such that the blank rests on the outer region of its underside (underside base surface). The diameter of the underside or the underside base surface of the blank is at least 1 mm greater than the diameter of the base surface spanned (by the carrier body or its support surface). In this sense, it is for example provided that the geometry of the surface of the blank facing the carrier body corresponds to the support surface or the base surface. This for example means that, after the forming process or the pressing or press-molding, the part of the blank resting on the carrier body or contacting the carrier body during heating is arranged in an edge region of the headlight lens which lies outside the optical path and rests on a transport element (see below) or its (corresponding) support surface, for example.

An annular support surface may comprise small discontinuities. Within the meaning of this disclosure, a base surface is for example an imaginary surface (in the region of which the blank resting on the carrier body is not in contact with the carrier body), which lies in the plane of the support surface and is surrounded by this support surface, plus the support surface. It is for example provided that the blank and the carrier body are coordinated with one another. This is for example understood to mean that the edge region of the blank rests on the carrier body on its underside. An edge region of a blank can be understood to mean the outer 10% or the outer 5% of the blank or its underside, for example.

Within the meaning of this disclosure, a blank is for example a portioned glass part or a preform or a gob.

Within the meaning of this disclosure, an optical element is for example a lens, for example a headlight lens or a lens-like free-form. Within the meaning of this disclosure, an optical element is for example a lens or a lens-like free-form comprising a supporting edge that is circumferential, discontinuous or circumferential in a discontinuous manner. Within the meaning of this disclosure, an optical element may e.g. be an optical element as described in WO 2017/059945 A1, WO 2014/114309 A1, WO 2014/114308 A1, WO 2014/114307 A1, WO 2014/072003 A1, WO 2013/178311 A1, WO 2013/170923 A1, WO 2013/159847 A1, WO 2013/123954 A1, WO 2013/135259 A1, WO 2013/068063 A1, WO 2013/068053 A1, WO 2012/130352 A1, WO 2012/072187 A2, WO 2012/072188 A1, WO 2012/072189 A2, WO 2012/072190 A2, WO 2012/072191 A2, WO 2012/072192 A1, WO 2012/072193 A2, or PCT/EP2017/000444, for example. Each of these documents is incorporated by reference in its entirety. The claimed method is applicable to non-symmetrical headlight lenses and non-rotationally symmetrical headlight lenses, for example. The claimed method is applicable to headlight lenses having non-symmetrical contours and to non-rotationally symmetrical contours, for example. The claimed method is applicable for example to headlight lenses having deterministic surface structures, as disclosed in WO 2015/031925 A1, for example, and for example having deterministic, non-periodic surface structures, as disclosed in DE 10 2011 114 636 A1, for example.

In an exemplary configuration, the base surface is polygon-shaped or polygonal, but for example with rounded corners, wherein it is for example provided that the underside base surface of the blank is also polygon-shaped or polygonal, but for example with rounded corners. In another exemplary configuration, the base surface is triangle-shaped or triangular, but for example with rounded corners, wherein it is for example provided that the underside base surface of the blank is also triangle-shaped or triangular, but for example with rounded corners. In one configuration, the base surface is rectangle-shaped or rectangular, but for example with rounded corners, wherein it is for example provided that the underside base surface of the blank is also rectangle-shaped or rectangular, but for example with rounded corners. In another exemplary configuration, the base surface is square, but for example with rounded corners, wherein it is for example provided that the underside base surface of the blank is also square, but for example with rounded corners. In another exemplary configuration, the base surface is oval, wherein it is for example provided that the underside base surface of the blank is also oval.

In another exemplary configuration, the carrier body is tubular at least in the region of the support surface. The carrier body for example consists (at least substantially) of steel or high-alloy steel (i.e. for example a steel in which the average mass content of at least one alloy element is 5%) or of a tube made of steel or high-alloy steel. In another exemplary configuration, the diameter of the hollow cross section of the carrier body or the internal tube diameter, at least in the region of the support surface, is no less than 0.5 mm and/or no greater than 1 mm. In another exemplary configuration, the external diameter of the carrier body or the external tube diameter, at least in the region of the support surface, is no less than 2 mm and/or no greater than 4 mm, for example no greater than 3 mm. In another exemplary configuration, the radius of curvature of the support surface orthogonally to the flow direction of the coolant is no less than 1 mm and/or no greater than 2 mm, for example no greater than 1.5 mm. In another exemplary configuration, the ratio of the diameter of the hollow cross section of the carrier body, at least in the region of the support surface, to the external diameter of the carrier body, at least in the region of the support surface, is no less than ¼ and/or no greater than ½. In another exemplary configuration, the carrier body is uncoated at least in the region of the support surface. In another exemplary configuration, coolant flows through the carrier body in accordance with the counterflow principle. In another exemplary configuration, the coolant is additionally and/or actively heated. In another exemplary configuration, the carrier body comprises at least two flow channels for the coolant flowing therethrough, which each only extend over a section of the annular support surface, wherein it is for example provided that two flow channels are connected in a region in which they leave the support surface by means of metal filler material, for example solder.

In another exemplary configuration, it is provided that, after press-molding, the optical element is placed on a transport element, is sprayed with surface-treatment agent on the transport element and, thereafter or subsequently, passes through an annealing kiln on the transport element without an optical surface of the optical element being contacted. Within the meaning of this disclosure, an annealing kiln is for example used for the controlled cooling of the optical element (for example with the addition of heat). Exemplary cooling regimes may e.g. be found in "Werkstoffkunde Glas" [Glass Materials Science], 1$^{st}$ edition, VEB Deutscher Verlag für Grundstoffindustrie, Leipzig VLN 152-915/55/75, LSV 3014, editorial deadline: 1.9.1974, order number: 54107, e.g. page 130 and "Glastechnik—BG 1/1— Werkstoff Glas" [Glass Technology—vol. 1/1—Glass: The Material], VEB Deutscher Verlag für Grundstoffindustrie, Leipzig 1972, e.g. page 61 ff (incorporated by reference in its entirety). It is necessary to comply with a cooling regime of this kind in order to prevent any internal stresses within the optical element or the headlight lens, which, although they are not visible upon visual inspection, can sometimes significantly impair the lighting properties as an optical element of a headlight lens. These impairments result in a corresponding optical element or headlight lens becoming unusable. It has surprisingly been found that, although spraying the hot optical element or headlight lens after press-molding or after removal from the mold following the press-molding changes the cooling regime, the resulting optical stresses are negligible. It is also surprising that a corresponding headlight lens ranges between the above-mentioned optical tolerances in relation to its optical property, although the refractive index is reduced by the proportion of quartz glass on the surface.

In an exemplary configuration, the transport element consists of steel. For clarification: The transport element is not part of the lens (or headlight lens), and the lens (or headlight lens) and the transport element are not part of a common, integral body.

In another exemplary configuration, the transport element is heated, for example inductively, before receiving the optical element. In another exemplary configuration, the transport element is heated at a heating rate of at least 20 K/s, for example of at least 30 K/s. In another exemplary configuration, the transport element is heated at a heating rate of no greater than 50 K/s. In another exemplary configuration, the transport element is heated by means of an energized winding/coil winding which is arranged above the transport element.

In another exemplary configuration, the optical element comprises a support surface, which lies outside the light path provided for the optical element, wherein the support surface, for example only the support surface, is in contact with a corresponding support surface of the transport element when the optical element is placed on the transport element. In another exemplary configuration, the support surface of the optical element is on the edge of the optical element. In another exemplary configuration, the transport element comprises at least one limiting surface for orienting the optical element on the transport element and for limiting or preventing a movement of the optical element on the transport element. In one configuration, the limiting surface or surfaces are provided above the corresponding support surface of the transport element. In another configuration, (at least) two limiting surfaces are provided, wherein it may be provided that one limiting surface is below the corresponding support surface of the transport element and one limiting surface is above the corresponding support surface of the transport element. In another exemplary configuration, the transport element is adapted, i.e. manufactured, for example milled, to the optical element or the support surface of the optical element.

The transport element or the support surface of the transport element is annular, for example, but is not circular, for example.

In another exemplary configuration, the preform is produced, cast and/or molded from molten glass. In another exemplary configuration, the mass of the preform is 20 g to 400 g.

In another exemplary configuration, the temperature gradient of the preform is set such that the temperature of the core of the preform is above 10 K+$T_G$.

In another exemplary configuration, to reverse its temperature gradient, the preform is first cooled, for example with the addition of heat, and then heated, wherein it is for example provided that the preform is heated such that the temperature of the surface of the preform after heating is at least 100° K, for example at least 150° K, higher than the glass transition temperature $T_G$. The glass transition temperature $T_G$ is the temperature at which the glass becomes hard. Within the meaning of this disclosure, the glass transition temperature $T_G$ is for example intended to be the temperature of the glass at which it has a viscosity log in a range around 13.2 dPas (corresponding to $10^{13.2}$ Pas), for example between 13 (corresponding to $10^{13}$ Pas) and 14.5 dPas (corresponding to $10^{14.5}$ Pas). In relation to the glass type B270, the transition temperature $T_G$ is approximately 530° C.

In another exemplary configuration, the temperature gradient of the preform is set such that the temperature of the upper surface of the preform is at least 30 K, for example at least 50 K, above the temperature of the lower surface of the preform. In another exemplary configuration, the temperature gradient of the preform is set such that the temperature of the core of the preform is at least 50 K below the temperature of the surface of the preform. In another exemplary configuration, the preform is cooled such that temperature of the preform before the heating is $T_G$–80 K to $T_G$+30 K. In another exemplary configuration, the temperature gradient of the preform is set such that the temperature of the core of the preform is 450° C. to 550° C. The temperature gradient is for example set such that the temperature in the core of the preform is below $T_G$ or close to $T_G$. In another exemplary configuration, the temperature gradient of the preform is set such that the temperature of the surface of the preform is 700° C. to 900° C., for example 750° C. to 850° C. In another exemplary configuration, the preform is heated such that its surface assumes a temperature (for example immediately before pressing) that corresponds to the temperature at which the glass of the preform has a viscosity log between 5 (corresponding to $10^5$ Pas) and 8 dPas (corresponding to $10^8$ Pas), for example a viscosity log between 5.5 (corresponding to $10^{5.5}$ Pas) and 7 dPas (corresponding to $10^7$ Pas).

It is for example provided that, before reversing the temperature gradient, the preform is removed from a mold for molding or producing the preform. It is for example provided that the temperature gradient is reversed outside a mold. Within the meaning of this disclosure, cooling with the addition of heat for example means that cooling is carried out a temperature of greater than 100° C.

Within the meaning of this disclosure, press-molding is for example understood to mean pressing a (for example optically active) surface such that subsequent finishing of the contour of this (for example optically active) surface is or can be omitted or is not provided. It is thus for example provided that a press-molded surface is not polished after the press-molding. Polishing, which influences the surface finish but not the contours of the surface, may be provided in some cases. Press-molding on both sides can for example be understood to mean that a (for example optically active) light exit surface is press-molded and a (for example optically active) light entry surface that is for example opposite the (for example optically active) light exit surface is likewise press-molded.

In one configuration, the blank is placed onto an annular support surface of a carrier body having a hollow cross section, and is heated on the carrier body for example such that a temperature gradient is set in the blank such that the blank is cooler in its interior than on its outer region, wherein the support surface is cooled by means of a coolant flowing through the carrier body, wherein the blank made of glass, after being heated, is press-molded, for example on both sides, to form the optical element, wherein the carrier body comprises at least two flow channels for the coolant flowing therethrough, which each only extend over a section of the annular support surface, and wherein two flow channels are connected in a region in which they leave the support surface by means of metal filler material, for example solder.

Within the meaning of this disclosure, a guide rod may be a rod, a tube, a profile, or the like.

Within the meaning of this disclosure, "fixed" for example means directly or indirectly fixed to a base of the pressing station or the press or a base on which the pressing station or press stands. Within the meaning of this disclosure, two elements are then fixed to one another, for example, when it is not provided that they are moved relative to one another for pressing.

For pressing, the first and the second mold are for example moved towards one another such that they form a closed mold or cavity or a substantially closed mold or cavity. Within the meaning of this disclosure, "moved towards one another" for example means that both molds are moved. It may, however, also mean that only one of the two molds is moved.

Within the meaning of the disclosure, a recess for example includes a bearing that couples or connects the recess to the corresponding guide rod. Within the meaning of this disclosure, a recess may be widened to form a sleeve or may be designed as a sleeve. Within the meaning of this disclosure, a recess may be widened to form a sleeve comprising an inner bearing or may be designed as a sleeve comprising an inner bearing.

In a matrix headlight, the optical element or a corresponding headlight lens is for example used as a secondary lens for imaging front optics. Within the meaning of this disclosure, front optics are for example arranged between the secondary optics and a light-source assembly. Within the meaning of this disclosure, front optics are for example arranged in the light path between the secondary optics and the light-source assembly. Within the meaning of this disclosure, front optics are for example an optical component for forming a light distribution depending on the light that is generated by the light-source assembly and is directed therefrom into the front optics. Here, a light distribution is generated or formed for example by TIR, i.e. by total reflection.

The optical element or a corresponding lens is also used in a projection headlight, for example. In the configuration as a headlight lens for a projection headlight, the optical element or a corresponding lens forms the edge of a light stop in the form of a cut-off line on the carriageway.

Within the meaning of this disclosure, a motor vehicle is for example a land vehicle that can be used individually in road traffic. Within the meaning of this disclosure, motor vehicles are not limited to land vehicles comprising internal combustion engines, for example.

Figure 1A:
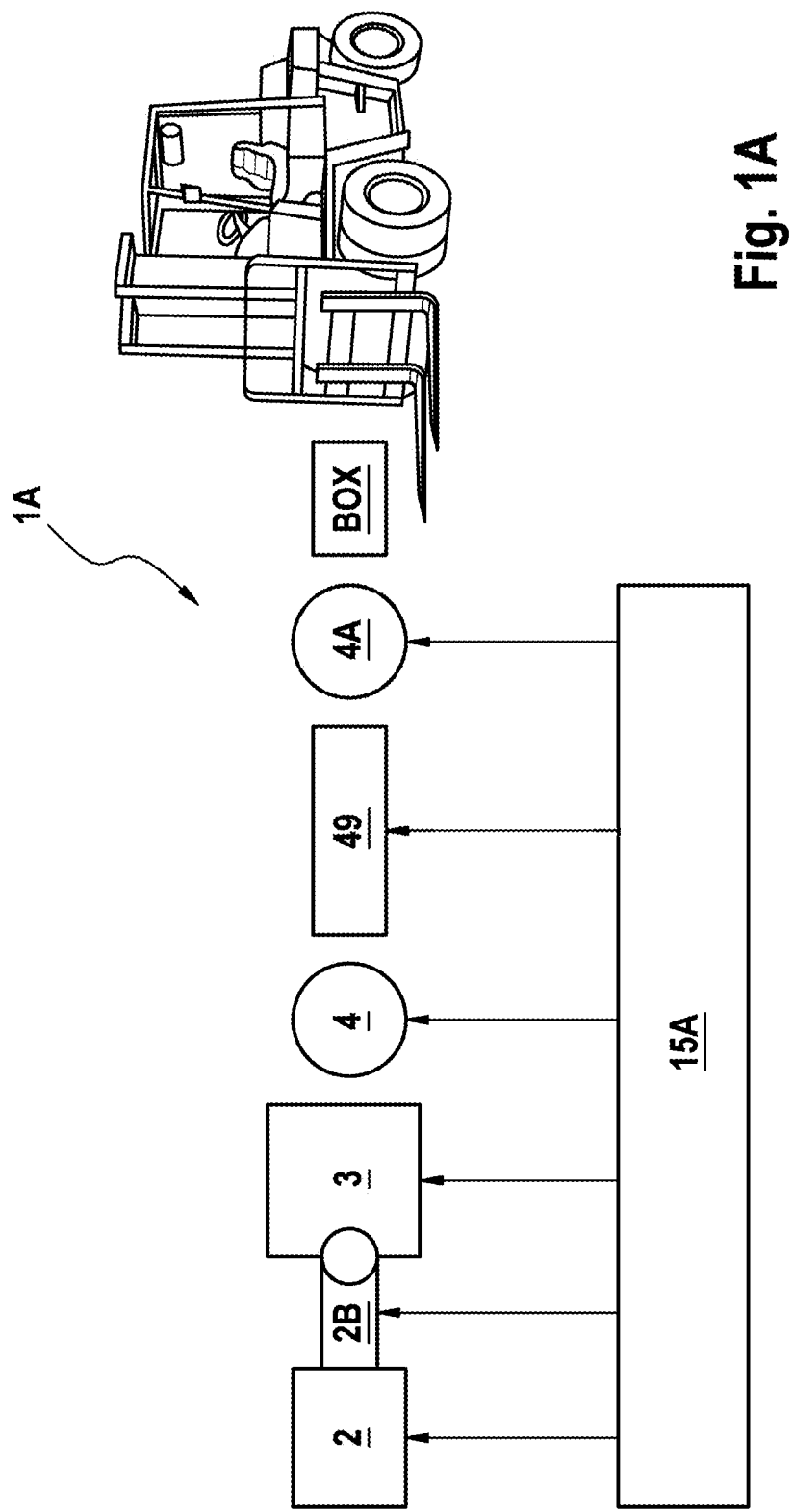
FIG. 1A is a schematic view of a device for producing gobs or optical elements made of glass.
Figure 1B:
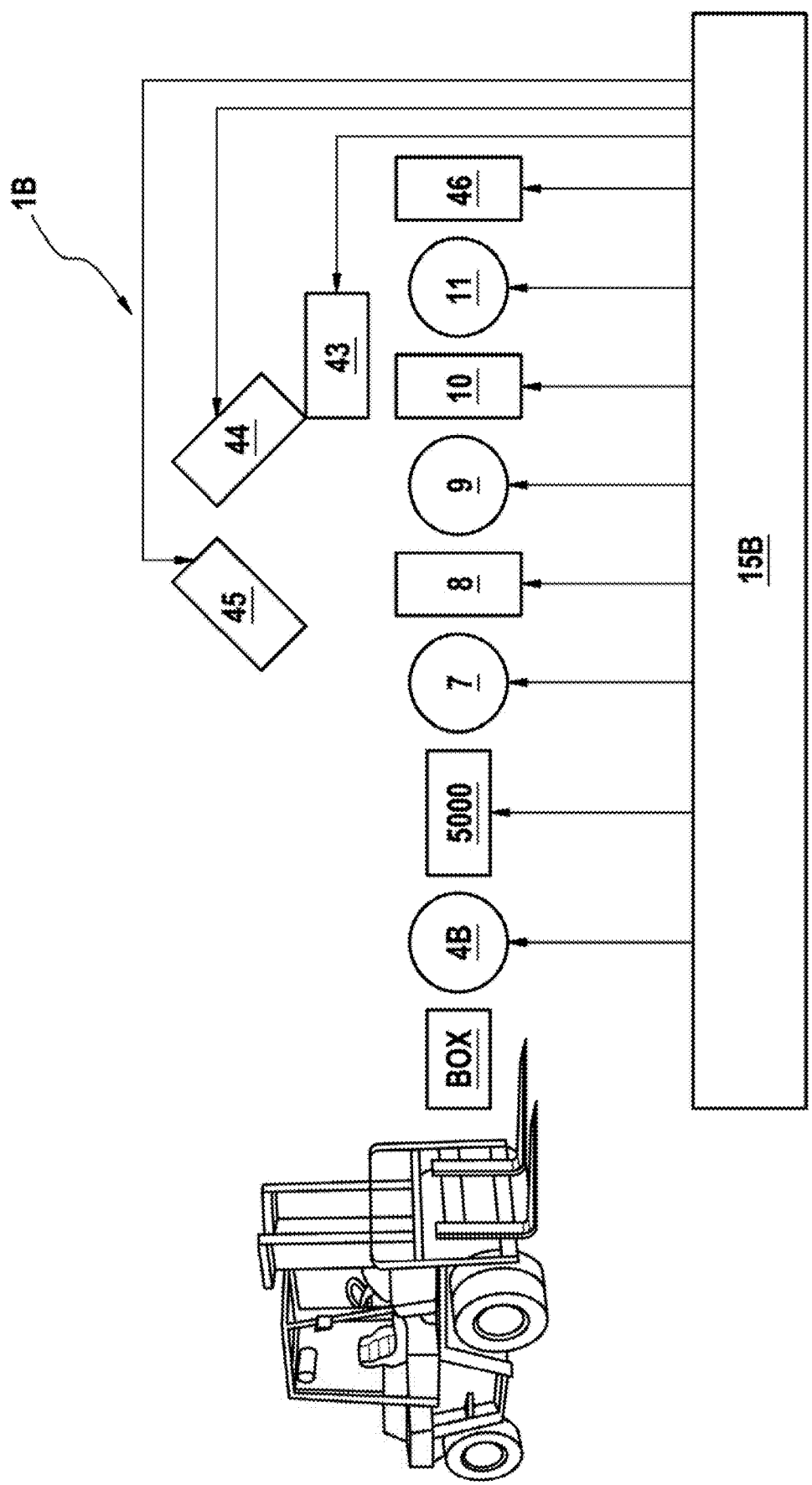
FIG. 1B is a schematic view of a device for producing motor-vehicle headlight lenses or lens-like free-forms for motor-vehicle headlights or optical elements made of glass.

Advantages and details will become clear from the following description of embodiments. In the drawings:

FIG. 1 and FIGS. 1A and 1B show a schematically shown device 1 or 1A and 1B for carrying out a method shown in FIG. 2A or 2B for producing optical elements, such as optical lenses, for example motor-vehicle headlight lenses, such as the (motor-vehicle) headlight lens 202 shown schematically in FIG. 34, or (lens-like) free-forms, for example for motor-vehicle headlights, for example the use thereof as described in the following with reference to FIG. 45.

Figure 34:
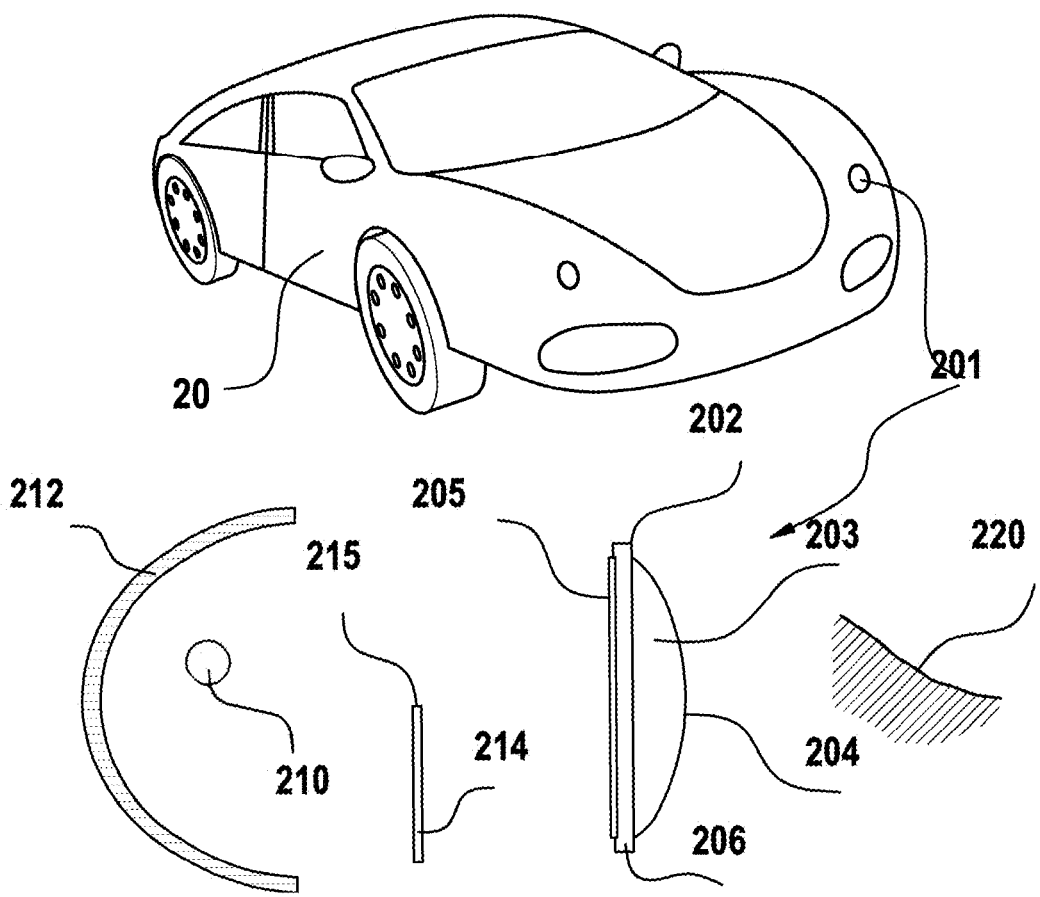
FIG. 34 is a schematic view of a motor-vehicle headlight (projection headlight) comprising a headlight lens.

FIG. 34 is a schematic view of a motor-vehicle headlight 201 (projection headlight) of a motor vehicle 20, comprising a light source 210 for generating light, a reflector 212 for reflecting light that can be generated by means of the light source 210, and a light stop 214. The motor-vehicle headlight 201 also comprises a headlight lens 202 for imaging an edge 215 of the light stop 214 as a cut-off line 220 by means of light that can be generated by the light source 210. Typical requirements placed on the cut-off line or on the light distribution taking into account or incorporating the cut-off line are disclosed e.g. in Bosch—Automotive Handbook, $9^{th}$ edition, ISBN 978-1-119-03294-6, page 1040. Within the meaning of this disclosure, a headlight lens is e.g. a headlight lens by means of which a cut-off line can be generated, and/or a headlight lens by means of which the requirements according to Bosch—Automotive Handbook, 9th edition, ISBN 978-1-119-03294-6 (incorporated by reference in its entirety), page 1040, can be met. The headlight lens 202 comprises a lens body 203 made of glass, which has a substantially planar (for example optically active) surface 205 facing the light source 210 and a substantially convex (for example optically active) surface 204 facing away from the light source 210. The headlight lens 202 also comprises a (for example circumferential) edge 206, by means of which the headlight lens 202 can be fastened in the motor-vehicle headlight 201. The elements in FIG. 34 are not necessarily shown to scale for the sake of simplicity and clarity. Therefore, for example, the scales of some elements are exaggerated compared with other elements in order to improve the understanding of the embodiment of the present disclosure.

Figure 35:
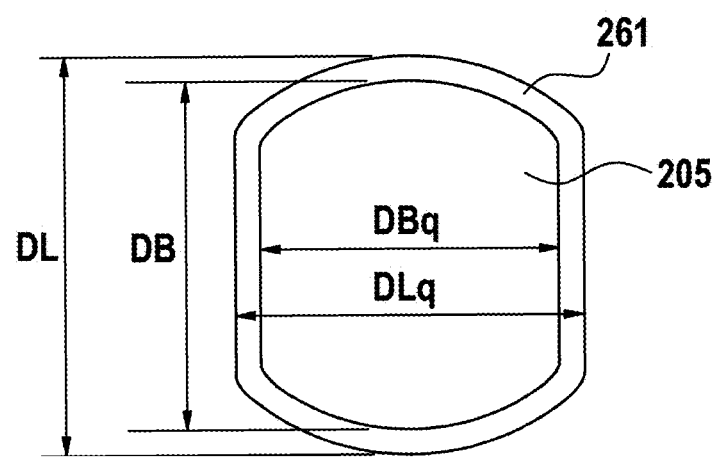
FIG. 35 is a view of a headlight lens according to FIG. 34 from below.
Figure 36:
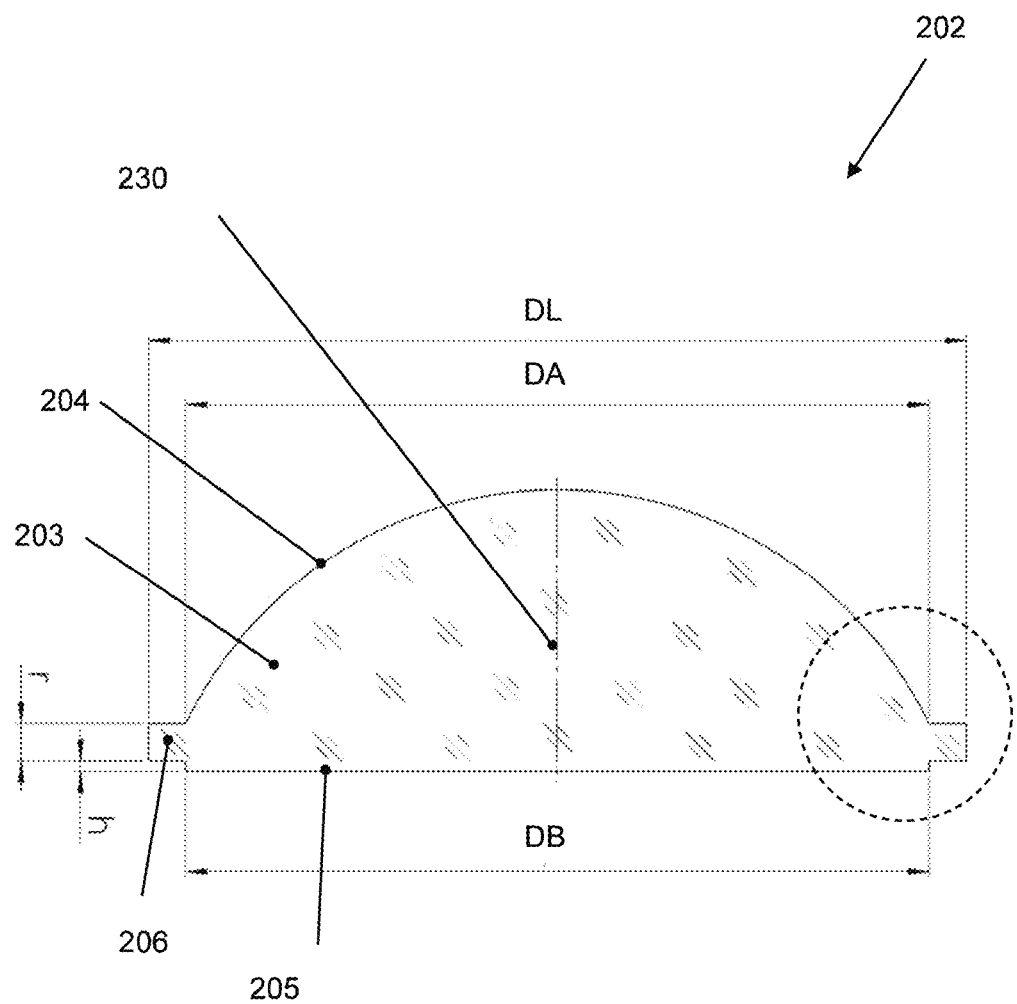
FIG. 36 is a cross section through the lens according to FIG. 35.
Figure 37:
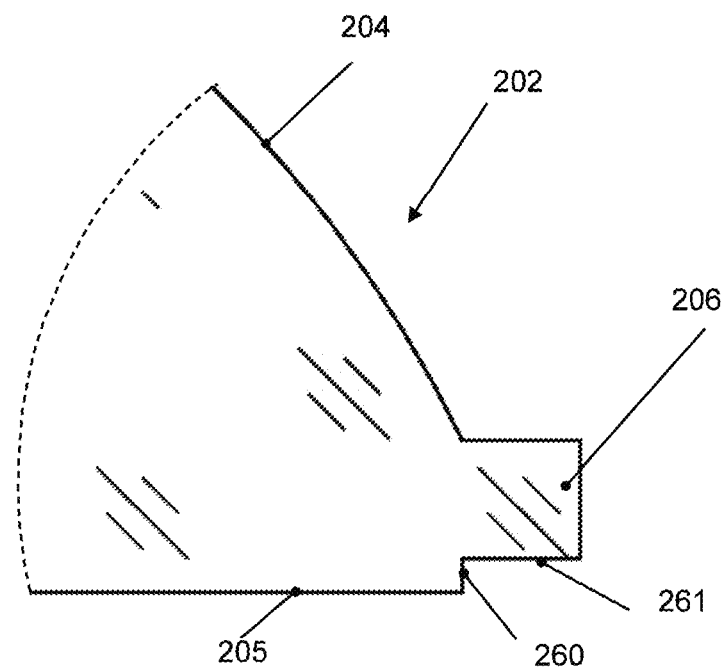
FIG. 37 is a detail of the view according to FIG. 36.

FIG. 35 is a view of the headlight lens 202 from below. FIG. 36 is a cross section through an embodiment of the headlight lens. FIG. 37 shows a detail of the headlight lens 202 marked by a dashed circle in FIG. 36. The planar (for example optically active) surface 205 projects in the form of a step 260 towards the optical axis 230 of the headlight lens 202 beyond the lens edge 206 or beyond the surface 261 of the lens edge 206 facing the light source 210, wherein the height h of the step 260 is e.g. no greater than 1 mm, for example no greater than 0.5 mm. The nominal value of the height h of the step 260 is for example 0.2 mm.

The thickness r of the lens edge 206 according to FIG. 36 is at least 2 mm, but no greater than 5 mm. According to FIGS. 35 and 36, the diameter DL of the headlight lens 202 is at least 40 mm, but no greater than 100 mm. The diameter DB of the substantially planar (for example optically active) surface 205 is equal to the diameter DA of the convex curved optically active surface 204. In one configuration, the diameter DB of the substantially planar optically active surface 205 is no greater than 110% of the diameter DA of the convex curved optically active surface 204. In addition, the diameter DB of the substantially planar optically active surface 205 is for example at least 90% of the diameter DA of the convex curved optically active surface 204. The diameter DL of the headlight lens 202 is for example approximately 5 mm greater than the diameter DB of the substantially planar optically active surface 205 and/or than the diameter DA of the convex curved optically active surface 204. The diameter DLq of the headlight lens 202 extending orthogonally to DL is at least 40 mm, but no greater than 80 mm, and is less than the diameter DL. The diameter DLq of the headlight lens 202 is for example approximately 5 mm greater than the diameter DBq that is orthogonal to DB.

In another exemplary configuration, the (optically active) surface 204 intended to face away from the light source and/or the (optically active) surface 205 intended to face the light source have a surface structure that scatters light (and is generated/pressed by molding). A suitable light-scattering surface structure e.g. includes modulation and/or (surface) roughness of at least 0.05 µm, for example at least 0.08 µm, and/or is configured as modulation optionally having an additional (surface) roughness of at least 0.05 µm, for example of at least 0.08 µm. Within the meaning of this disclosure, roughness is intended to be defined as Ra, for example in accordance with ISO 4287. In another exemplary configuration, the light-scattering surface structure may have a structure that simulates the surface of a golf ball or may be configured as a structure that simulates the surface of a golf ball. Suitable light-scattering surface structures are disclosed in DE 10 2005 009 556, DE 102 26 471 B4 and DE 299 14 114 U1, for example. Other configurations of light-scattering surface structures are disclosed in the German patent specification 1 099 964, DE 36 02 262 C2, DE 40 31 352 A1, U.S. Pat. No. 6,130,777, US 2001/0033726 A1, JP 10123307 A, JP 09159810 A, DE 11 2018 000 084.2 and JP 01147403 A.

Figure 39:
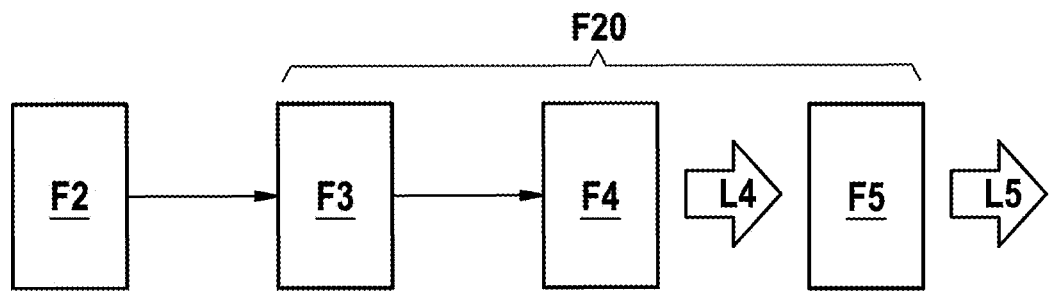
FIG. 39 is a schematic view of an embodiment of a vehicle headlight according to FIG. 1.
Figure 40:
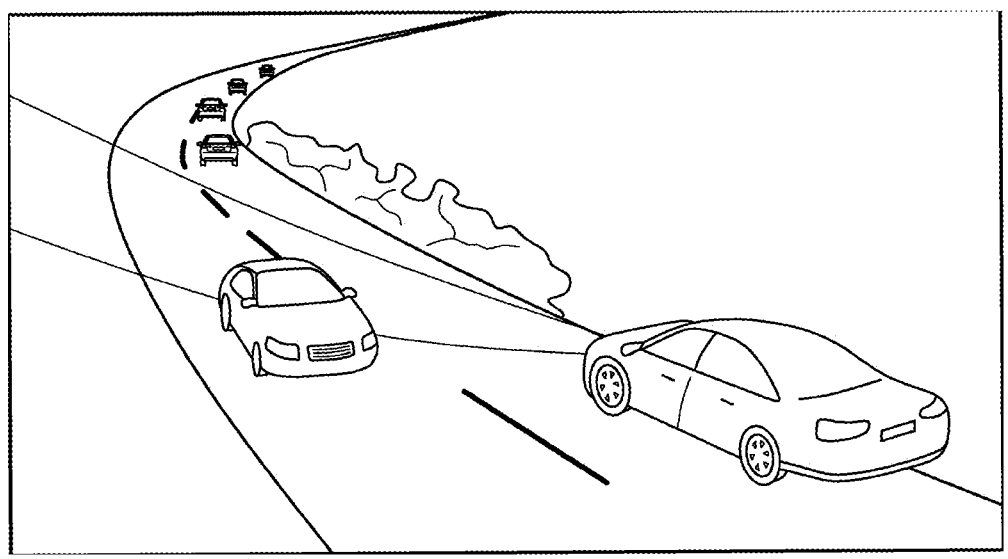
FIG. 40 shows an embodiment of matrix light or adaptive high beam.
Figure 41:
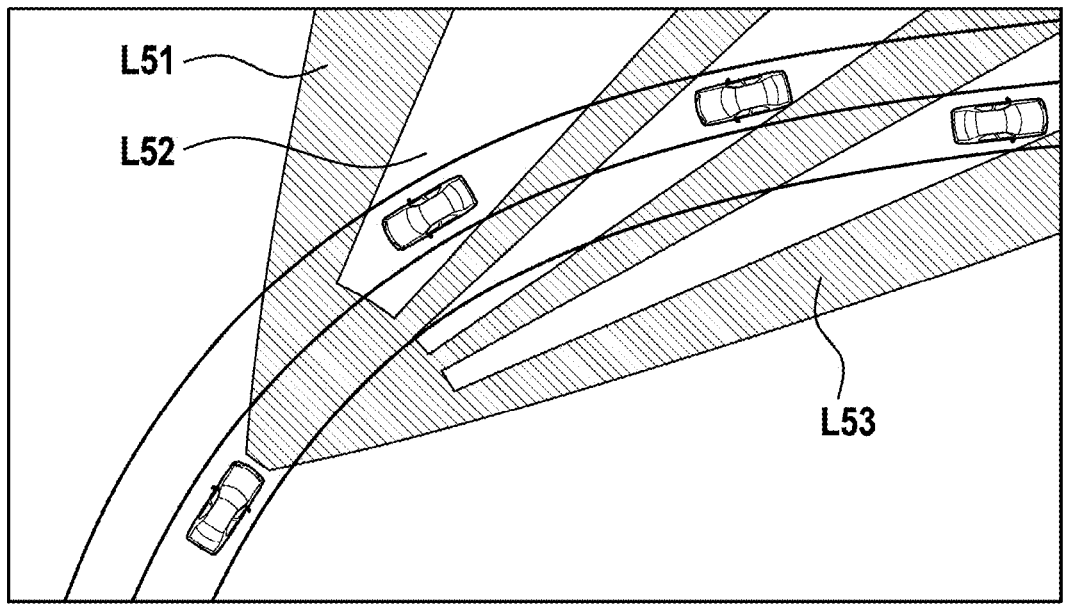
FIG. 41 shows another embodiment of matrix light or adaptive high beam.

FIG. 39 shows an adaptive headlight or vehicle headlight F20 for the situation-dependent or traffic-dependent illumination of the surroundings or carriageway in front of the motor vehicle 20 on the basis of a surround sensor system F2 of the motor vehicle 20. For this purpose, the vehicle headlight F20 shown schematically in FIG. 39 comprises an illumination device F4, which is actuated by means of a controller F3 of the vehicle headlight F20. Light L4 generated by the illumination device F4 is emitted by the vehicle headlight F20 in the form of an illumination pattern L5 by means of an objective lens F5, which may comprise one or more optical lens elements or headlight lenses. Examples of corresponding illumination patterns are shown in FIGS. 40 and 41, and the websites web.archive.org/web/20150109234745/http://www.audi.de/content/de/brand/de/vorsprung_durch_technik/content/2013/08/Audi-A8-er-strahlt-in-neuem-Licht.html (retrieved on 5 Sep. 2019) and www.all-electronics.de/matrix-led-und-laserlicht-bietet-viele-vorteile/(retrieved on 2 Sep. 2019). In the configuration according to FIG. 41, the illumination pattern L5 comprises full-beam regions L51, dimmed regions L52 and cornering light L53.

Figure 42:
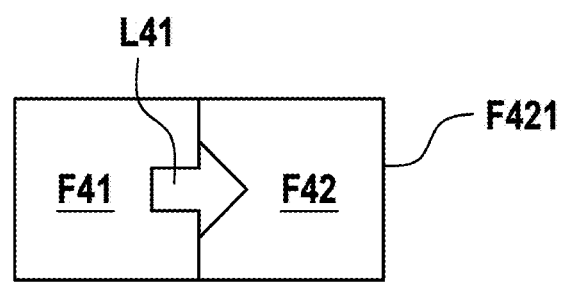
FIG. 42 shows an embodiment of an illumination device of a vehicle headlight according to FIG. 39.

FIG. 42 shows an embodiment of the illumination device F4, wherein it comprises a light-source assembly F41 having a plurality of individually adjustable regions or pixels. Therefore, up to 100 pixels, up to 1,000 pixels or no less than 1,000 pixels may for example be provided, which can be individually actuated by means of the controller F3 to the effect that they can be individually activated or deactivated, for example. It may be provided that the illumination device F4 also comprises front optics F42 for generating a light pattern (such as L4) on the light exit surface F421 on the basis of the accordingly actuated regions or pixels of the light-source assembly F41 or according to the light L41 directed into the front optics F42.

Within the meaning of this disclosure, matrix headlights may also be matrix SSL HD headlights. Examples of headlights of this kind are found at the links www.springerprofessional.de/fahrzeug-lichttechnik/fahrzeugsicherheit/hella-bringt-neues-ssl-hd-matrix-lichtsystem-auf-den-markt/17182758 (retrieved on 28 May 2020), www.highlight-web.de/5874/hella-ssl-hd/ (retrieved on 28 May 2020) and www.hella.com/techworld/de/Lounge/Unser-Digital-Light-SSL-HD-Lichtsystem-ein-neuer-Meilenstein-der-automo-bilen-Lichttechnik-55548/ (retrieved on 28 May 2020).

Figure 43:
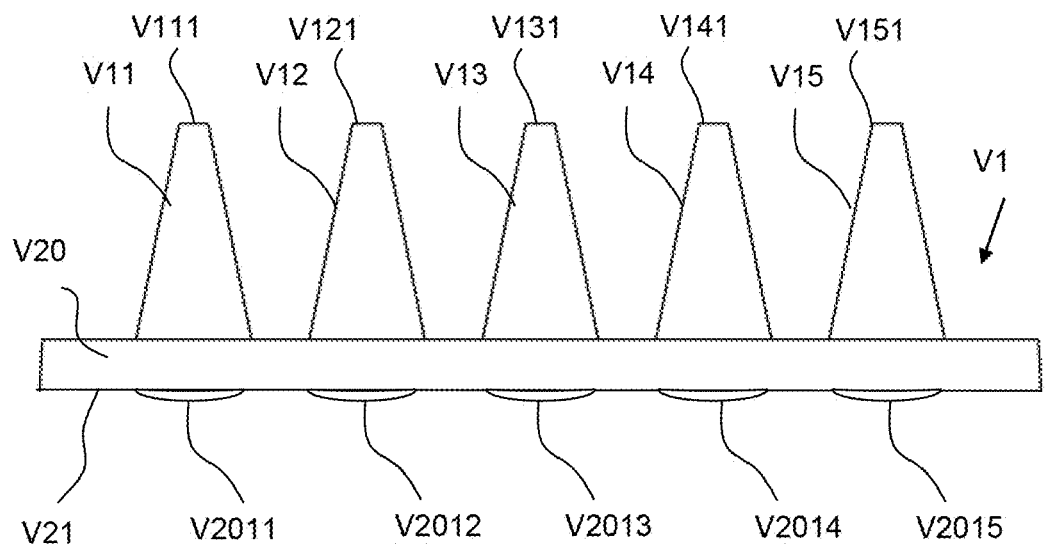
FIG. 43 is a side view of an embodiment of a front optics array.
Figure 44:
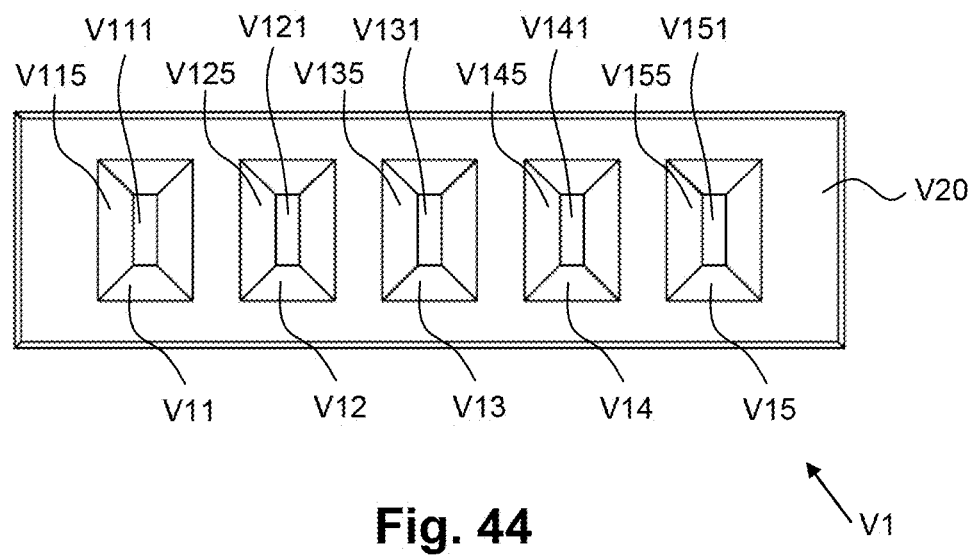
FIG. 44 is a plan view of the front optics array according to FIG. 43.

FIG. 43 is a side view of an integral front optics array V1. FIG. 44 is a rear plan view of the front optics array V1. The front optics array V1 comprises a base part V20, on which lenses V2011, V2012, V2013, V2014 and V2015 and front optics V11 having a light entry surface V111, front optics V12 having a light entry surface V121, front optics V13 having a light entry surface V131, front optics V14 having a light entry surface V141 and front optics V15 having a light entry surface V151 are molded. The side surfaces V115, V125, V135, V145, V155 of the front optics V11, V12, V13, V14, V15 are press-molded and are formed such that light which enters the relevant light entry surface V111, V121, V131, V141 or V151 by means of a light source is subjected to total reflection (TIR), such that this light exits the base part V20 or the surface V21 of the base part V20 which forms the common light exit surface of the front optics V11, V12, V13, V14 and V15. The rounding radii between the light entry surfaces V111, V121, V131, V141 and V151 at the transition to the side surface V115, V125, V135, V145 and V155 are e.g. 0.16 to 0.2 mm.

Figure 45:
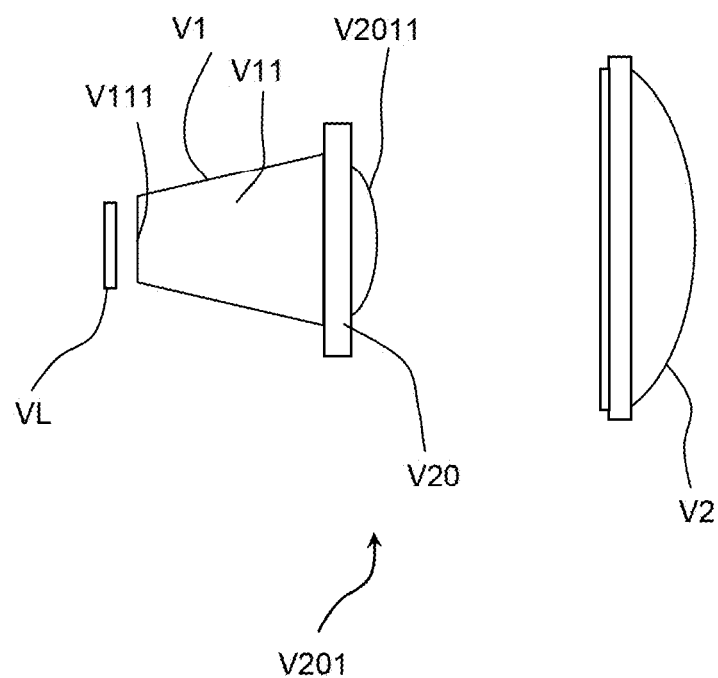
FIG. 45 shows the use of a front optics array according to FIGS. 43 and 44 in a motor-vehicle headlight.

FIG. 45 is a schematic view of a vehicle headlight V201 or motor-vehicle headlight. The vehicle headlight V201 comprises a light-source assembly VL, for example comprising LEDs, for directing light into the light entry surface V111 of the front optics V11 or the light entry surfaces V112, V113, V114 and V115 (not shown in greater detail) of the front optics V12, V13, V14 and V15. In addition, the vehicle headlight V201 comprises a secondary lens V2 for imaging the light exit surface V21 of the front optics array V1.

Figure 46:
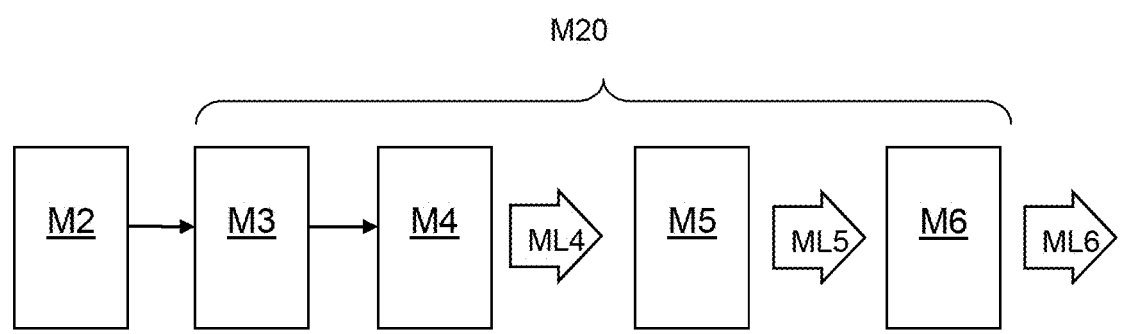
FIG. 46 shows another embodiment of an alternative vehicle headlight.

Another suitable field of application for lenses produced according to the disclosure is for example disclosed in DE 10 2017 105 888 A1 or the headlight described with reference to FIG. 46. In this case, by way of example, FIG. 46 shows a light module (headlight) M20 which comprises a light-emission unit M4 having a plurality of punctiform light sources that are arranged in a matrix-like manner and each emit light ML4 (with a Lambert's emission characteristic), and also comprises a concave lens M5 and projection optics M6. In the example according to FIG. 46 shown in DE 10 2017 105 888 A1, the projection optics M6 comprise two lenses which are arranged one behind the other in the beam path and have been produced according to a method corresponding to the above-mentioned method. The projection optics M6 image the light ML4 emitted by the light-emission unit M4 and light ML5 that is further shaped after passing through the concave lens M5, in the form of a resulting light distribution ML6 of the light module M20, on a carriageway in front of the motor vehicle in which the light module or headlight is (has been) installed.

The light module M20 comprises a controller denoted by reference sign M3, which actuates the light-emission unit M4 on the basis of the values from a sensor system or surround sensor system M2. The concave lens M5 comprises a concave curved exit surface on the side facing away from the light-emission unit M4. The exit surface of the concave lens M5 deflects light ML4 directed into the concave lens M5 from the light-emission unit M4 at a large emission angle towards the edge of the concave lens by means of total reflection, such that said light is not transmitted through the projection optics M6. According to DE 10 2017 105 888 A1, light beams that are emitted from the light-emission unit M4 at a "large emission angle" are referred to as those light beams which (without arranging the concave lens M5 in the beam path) would be imaged poorly, for example in a blurred manner, on the carriageway by means of the projection optics M6 owing to optical aberrations and/or could result in scattered light, which reduces the contrast of the imaging on the carriageway (see also DE 10 2017 105 888 A1). It may be provided that the projection optics M6 can only image light in focus at an opening angle limited to approximately +/−20°. Light beams having opening angles of greater than +/−20°, for example greater than +/−30°, are therefore prevented from impinging on the projection optics M6 by arranging the concave lens M5 in the beam path.

The light-emission unit M4 may be designed differently. According to one configuration, the individual punctiform light sources of the light-emission unit M4 each comprise a semiconductor light source, for example a light-emitting diode (LED). The LEDs may be actuated individually or in groups in a targeted manner in order to activate or deactivate or dim the semiconductor light sources. The light module M20 e.g. comprises more than 1,000 individually actuatable LEDs. For example, the light module M20 may be designed as what is known as a µAFS (micro-structured adaptive front-lighting system) light module.

According to an alternative option, the light-emission unit M4 comprises a semiconductor light source and a DLP or micromirror array, which comprises a large number of micromirrors which can be actuated and tilted individually, wherein each of the micromirrors forms one of the punctiform light sources of the light-emission unit M4. The micromirror array for example comprises at least 1 million micromirrors, which may for example be tilted at a frequency of up to 5,000 Hz.

Figure 47:
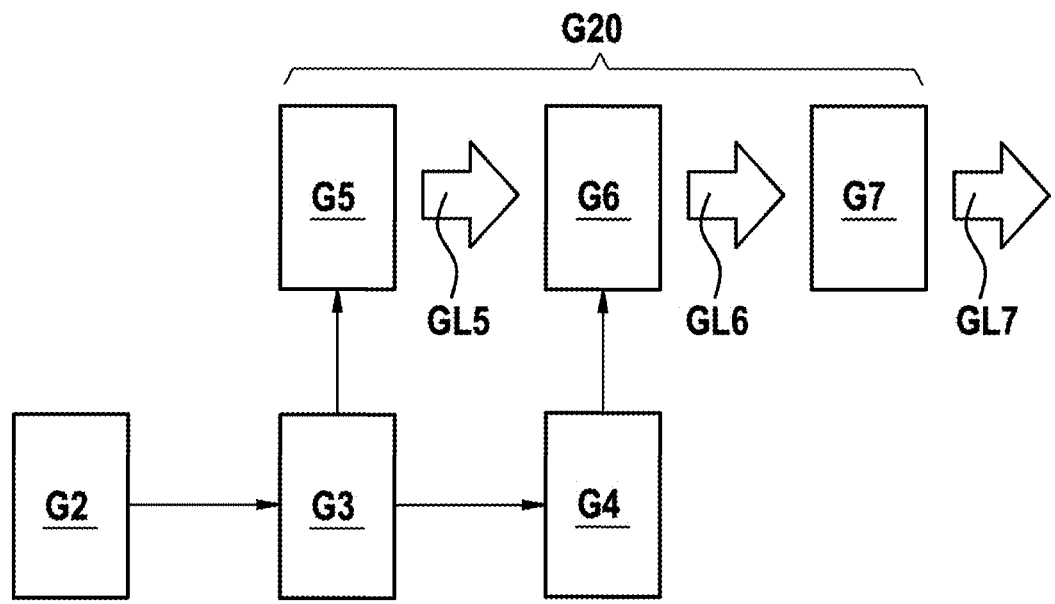
FIG. 47 shows another embodiment of an alternative vehicle headlight.
Figure 48:
FIG. 48 shows an example of the illumination by means of a headlight according to FIG. 47.

Another example of a headlight system or light module (DLP system) is disclosed by the link www.al-lighting.com/news/article/digital-light-millions-of-pixels-on-the-road/ (retrieved on 13 Apr. 2020). FIG. 47 schematically shows a corresponding headlight module or vehicle headlight for generating an illumination pattern denoted by GL7A in FIG. 48. The adaptive headlight G20 schematically shown in FIG. 47 for the situation-dependent or traffic-dependent illumination of the surroundings or carriageway in front of the motor vehicle 20 on the basis of a surround sensor system G2 of the motor vehicle 20. Light GL5 generated by the illumination device G5 is shaped by means of a system of micromirrors G6, as also shown in DE 10 2017 105 888 A1, to form an illumination pattern GL6 which, by means of projection optics G7 for adaptive illumination, radiates suitable light GL7 in front of the motor vehicle 20 or in the surroundings onto the carriageway in front of the motor vehicle 20. A suitable system G6 of movable micromirrors is disclosed by the link www.al-lighting.com/news/article/digital-light-millions-of-pixels-on-the-road/(retrieved on 13 Apr. 2020).

A controller G4 is provided for actuating the system G6 comprising movable micromirrors. In addition, the headlight G20 comprises a controller G3 both for synchronizing with the controller G4 and for actuating the illumination device G5 on the basis of the surround sensor system G2. Details of the controllers G3 and G4 can be found at the link www.al-lighting.com/news/article/digital-light-millions-of-pixels-on-the-road/(retrieved on 13 Apr. 2020). The illumination device G5 may for example comprise an LED assembly or a comparable light-source assembly, optics such as a field lens (which, for example, has likewise been produced according to the above-described method) and a reflector.

Figure 49:
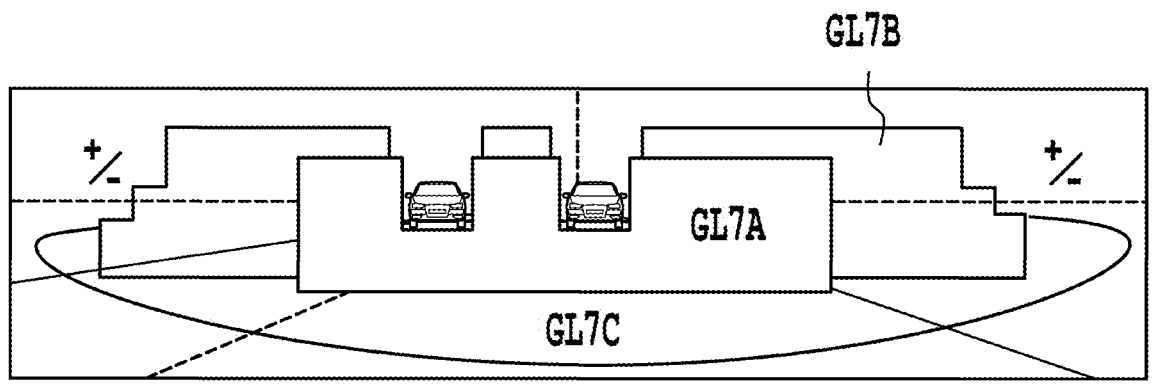
FIG. 49 shows an embodiment of superimposed illumination by means of the illumination according to FIG. 48 and the illumination by two other headlight systems or sub-systems.

The vehicle headlight G20 described with reference to FIG. 47 may for example be used in connection with other headlight modules or headlights in order to obtain a superimposed overall light profile or illumination pattern. This is shown by way of example in FIG. 49, wherein the overall illumination pattern is compiled from the illumination patterns GL7A, GL7B and GL7C. In this process, it may for example be provided that the illumination pattern GL7C is generated by means of the headlight 20 and the illumination pattern GL7B is generated by means of the headlight V201.

Figure 50:
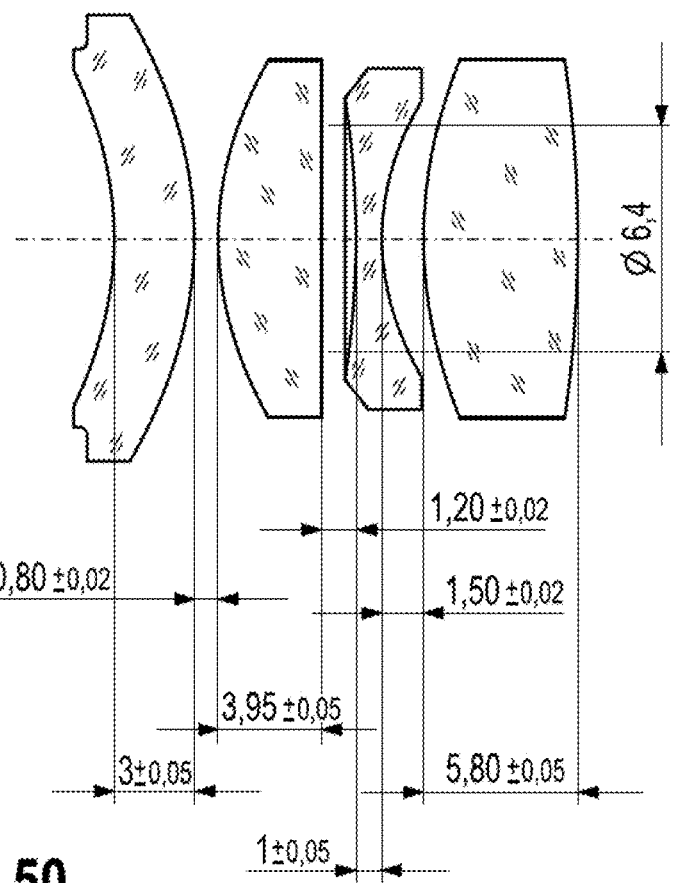
FIG. 50 shows an embodiment of an objective lens.
Figure 51:
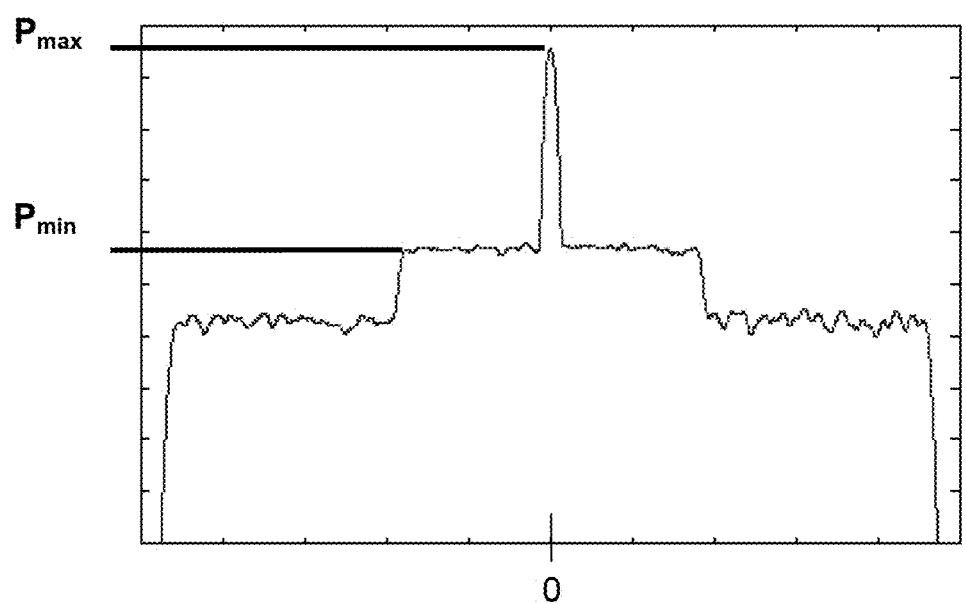
FIG. 51 shows luminous power plotted logarithmically against the distance from a considered point of an object.

Sensor systems for the above-mentioned headlights for example comprise a camera and analysis or pattern recognition for analyzing a signal provided by the camera. A camera for example comprises an objective lens or a multiple-lens objective lens as well as an image sensor for imaging an image generated by the objective lens on the image sensor. In a particularly suitable manner, an objective lens is used as disclosed in U.S. Pat. No. 8,212,689 B2 (incorporated by reference in its entirety) and shown by way of example in FIG. 50. An objective lens of this kind is particularly suitable because it prevents or significantly reduces parasitic images, since an objective lens of this kind can for example prevent a parasitic image of a vehicle coming in the other direction with its lights on being confused with a vehicle driving in front with its lights on. A suitable objective lens, for example for infrared light and/or visible light, images an object in an image plane, wherein, in relation to the imaging of an object, it is applicable to each point within the image circle of the objective lens or to at least one point within the image circle of the objective lens that Pdyn≥70 dB, for example Pdyn≥80 dB, for example Pdyn≥90 dB, wherein Pdyn is equal to 10·log(Pmax/Pmn), as shown in FIG. 51, wherein Pmax is the maximum luminous power of a point in the image plane for imaging a point on the object, and wherein Pmin is the luminous power of another point in the image plane for imaging the point on the object, the luminous power of which in relation to the imaging of the point on the object is greater than the luminous power of each other point in the image plane in relation to the imaging of the point on the object or wherein Pmin is the maximum luminous power of the parasitic-image signals from the point on the object as imaged at another point. The lenses or some of the lenses of the objective lens shown in FIG. 50 can be produced according to the claimed or disclosed method, wherein it is for example provided that the accordingly produced lenses comprise a circumferential or partially circumferential edge, in a departure from the view in FIG. 50.

Figure 52:
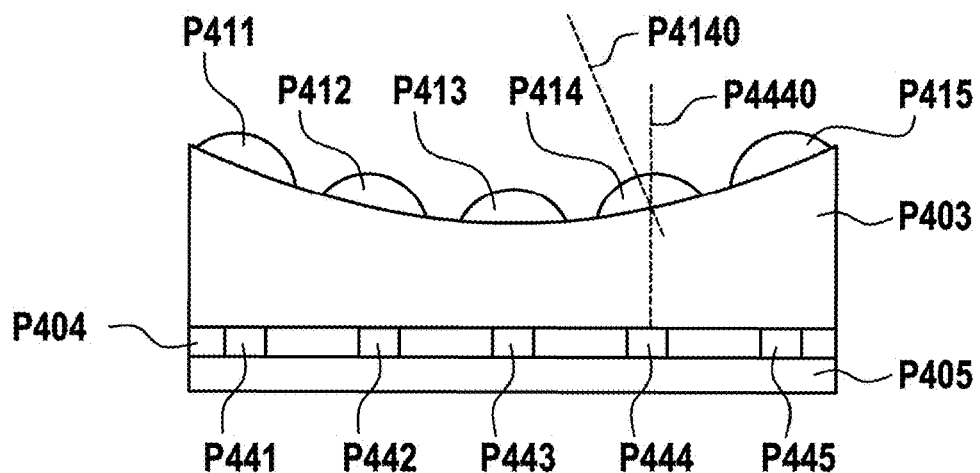
FIG. 52 shows a projection display comprising a microlens array having a curved base surface.

Another embodiment for the use of the method described in the following is the production of microlens arrays, for example microlens arrays for projection displays. A microlens array of this kind and its use in a projection display are shown in FIG. 52. Microlens arrays and projection displays are described in WO 2019/072324, DE 10 2009 024 894, DE 10 2011 076 083 and DE 10 2020 107 072, for example. The microlens array according to FIG. 52 is an integral, pressed glass part (pressed from a gob), which integrally combines the substrate or carrier P403 and the projection lenses P411, P412, P413, P414, P415. In addition, the projection lenses P411, P412, P413, P414, P415 having a concave contour, or a parabolic contour are arranged one after the other. Owing to this arrangement, the optical axis P4140 of the projection lenses, such as the projection lens P414, is tilted relative to the orthogonal P4440 of the object structure P444 (see below), for example. A metal mask P404 is arranged on a side of the carrier P403 facing away from the projection lenses P411, P412, P413, P414, P415, wherein said mask comprises recesses, in which object structures P441, P442, P443, P444 and P445 are arranged. An illumination layer P405 is arranged over the object structures. It may also be provided that the illumination layer P405 comprises a transparent electrode, a light-emitting layer and a reflective back electrode. A light source as disclosed in U.S. Pat. No. 8,998,435 B2 also comes into consideration as an alternative illumination means.

Figure 2A:
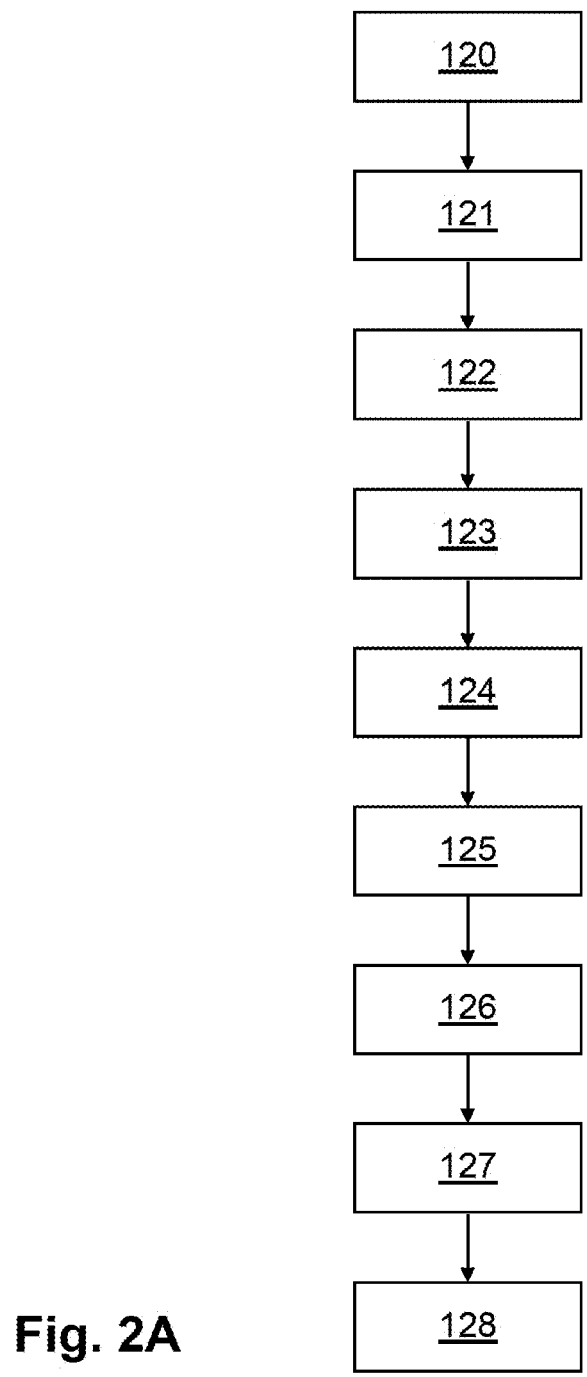
FIG. 2A shows an exemplary sequence of a method for producing motor-vehicle headlight lenses or lens-like free-forms for a motor-vehicle headlight or optical elements made of glass.

The device 1 according to FIG. 1 for producing optical elements such as the headlight lens 202 comprises a melting unit 2, such as a trough, in which soda-lime glass, in the present embodiment DOCTAN®, is melted in a process step 120 according to FIG. 2A. The melting unit 2 may e.g. comprise an adjustable outlet 2B. In a process step 121, liquid glass is brought from the melting unit 2 into a preform device 3 for producing a preform, such as a gob, for example having a mass of from 10 g to 400 g, for example a mass of from 50 g to 250 g, or a preform that is close to the final contours (a preform that is close to the final contours has a contour that is similar to the contour of the motor-vehicle headlight lens to be pressed or to the lens-like free-form for motor-vehicle headlights). This may e.g. comprise molds in which a defined quantity of glass is cast. The preform is produced in a process step 122 by means of the preform device 3.

The process step 122 is followed by a process step 123, in which the preform is transferred to the cooling apparatus 5 by means of a transfer station 4 and is cooled by means of the cooling apparatus 5 at a temperature of between 300° C. and 500° C., for example of between 350° C. and 450° C. In the present embodiment, the preform is cooled for over 10 minutes at a temperature of 400° C., such that its temperature in the interior is approximately 500° C. or greater, for example 600° C. or greater, for example $T_G$ or greater.

In a subsequent process step 124, the preform is heated by means of the heating apparatus 6 at a temperature of no less than 700° C. and/or no greater than 1600° C., for example of between 1,000° C. and 1250° C., wherein it is for example provided that the preform is heated such that the temperature of the surface of the preform after the heating is at least 100° C., for example at least 150° C., greater than $T_G$ and is for example 750° C. to 900° C., for example 780° C. to 850° C. A combination of the cooling apparatus 5 with the heating apparatus 6 is an example of a temperature-control apparatus for setting the temperature gradient.

Figure 14:
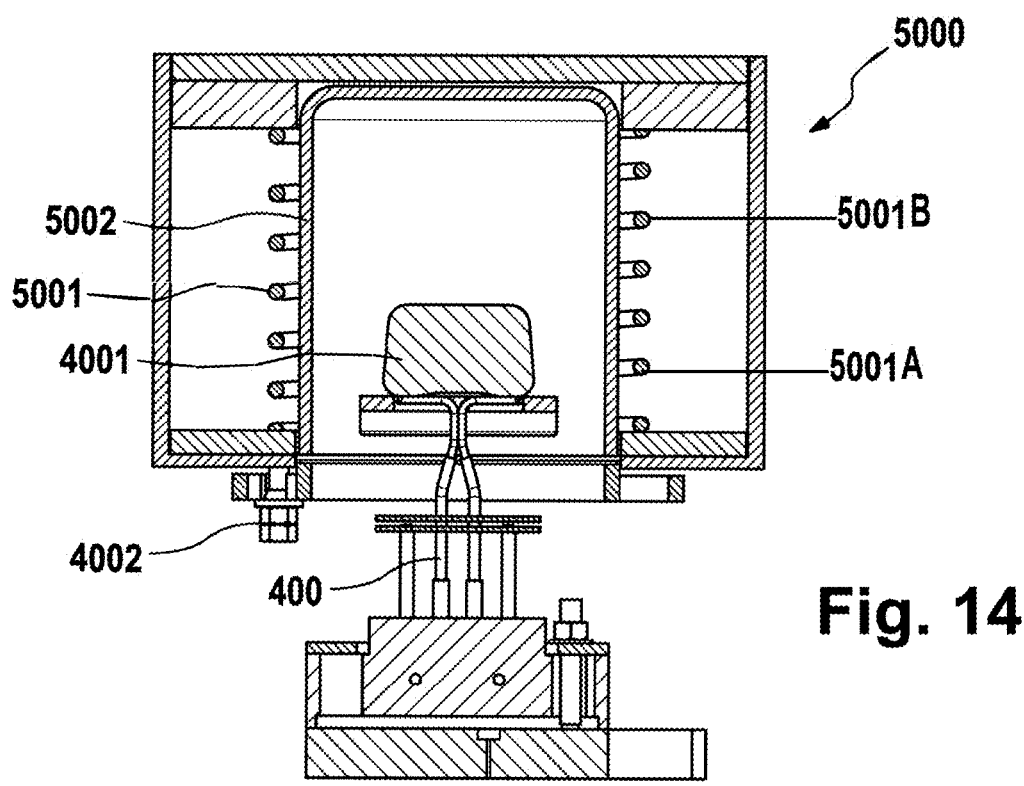
FIG. 14 shows a lance according to FIG. 3 in a hood-type annealing furnace comprising a protective cover for heating a gob.
Figure 15:
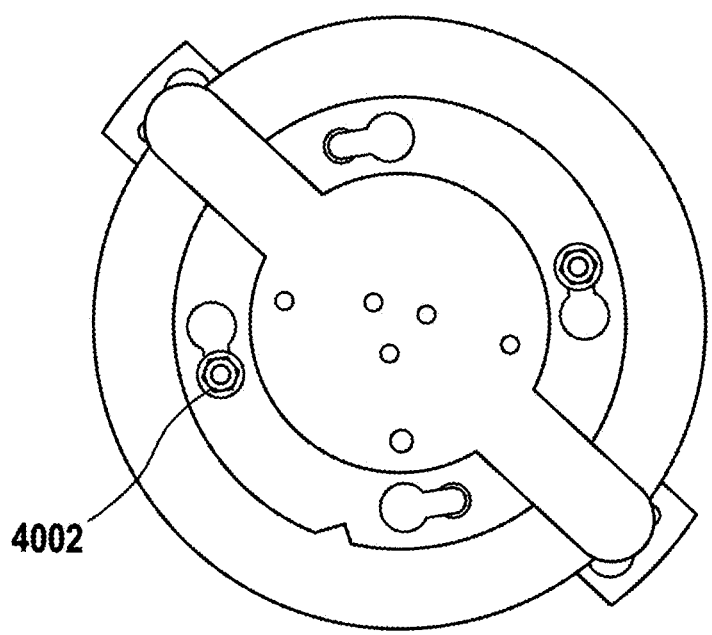
FIG. 15 is a view of the hood-type annealing furnace according to FIG. 14 from below.

In one configuration, this temperature-control apparatus and/or the combination of the heating apparatuses 5 and 6 is designed as a hood-type annealing furnace 5000, as shown in FIG. 14. FIG. 14 shows a preform to be heated in the form of a gob 4001 on a support device 400 designed as a lance. Heating coils 5001 are provided for heating the gob 4001. In order to protect these heating coils 5001 against a defective gob bursting open, the interior of the hood-type annealing furnace 5000 is lined with a protective cover 5002. FIG. 15 is a view of the hood-type annealing furnace 5000 according to FIG. 14 from below, FIG. 16 is a cross section through the protective cover 5002 according to FIG. 14, and FIG. 17 is a view into the interior of the protective cover 5002 according to FIG. 14. In the embodiment according to FIG. 14, this protective cover 5002 is configured to be cup-shaped. In this configuration, the protective cover 5002 comprises a cylindrical region 5112, which transitions into a covering region 5122 via a rounded region 5132. The radius of curvature of the curved region 5132 is between 5 mm and 20 mm, for example. In the embodiment according to FIG. 16, the radius of curvature of the curved region 5132 is approximately 10 mm. The protective cover 5002 is secured in the hood-type annealing furnace 5000 and is fixed by a nut 4002. In another preferred configuration, a bayonet catch is provided, by means of which a protective cover can be changed more rapidly.

FIG. 19 is a cross section through an embodiment of another protective cover 5202. FIG. 20 is a view into the interior of the protective cover 5202 according to FIG. 19. The protective cover 5202 is likewise configured to be cup-shaped, but also comprises a conical region 5242 in addition to a cylindrical region 5212. The conical region 5242 transitions into a covering region 5222 via a curvature 5232. The conical region 5242 defines a volume which is between 30% and 50% of the volume of the cavity in the protective cover 5202.

FIG. 21 is a cross section through an embodiment of another protective cover 5302, FIG. 22 is a view into the interior of the protective cover 5302 according to FIG. 21, and FIG. 23 is a perspective view of the protective cover 5302. The protective cover 5302 is likewise configured to be cup-shaped, but also comprises a conical region 5342 in addition to a cylindrical region 5312. The conical region 5342 transitions into a covering region 5322 via a curvature 5332. The conical region 5342 defines a volume which is between 30% and 50% of the volume of the cavity in the protective cover 5302.

The protective covers 5002, 5202, 5302 for example have the purpose of protecting the heating coils 5001 positioned in the furnace against glass bursting open. If a gob bursts open in the furnace without this protective cover, SOME of the glass or the majority of the glass clings to the heating coils 5001 and thus significantly impairs the heating process for the next gob or even destroys the heating coils 5001 and thus destroys the entire functional capability of the furnace. The protective covers 5002, 5202, 5302 are removed after a gob has burst and are replaced with other protective covers. The protective covers 5002, 5202, 5302 are adapted to the size of the furnace.

The heating coils 5001 can consist of or comprise a plurality of independently actuatable heating coils 5001A and 5001B. Because said coils are independently actuatable, a particularly suitable, for example homogeneous, temperature (distribution) can be obtained inside the furnace or inside the protective covers 5002, 5202, 5303. In addition to their function of reducing the severity of a gob bursting open, the protective covers 5002, 5202, 5303 contribute to this desired temperature distribution. The protective covers consist of or comprise silicon carbide, for example.

Figure 5:
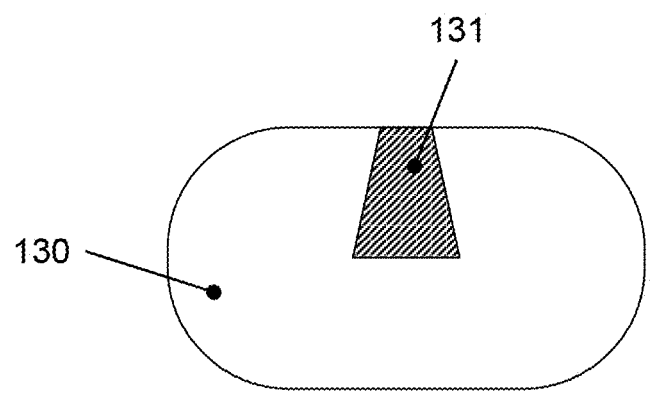
FIG. 5 shows an exemplary preform before entering a temperature-control apparatus.
Figure 6:
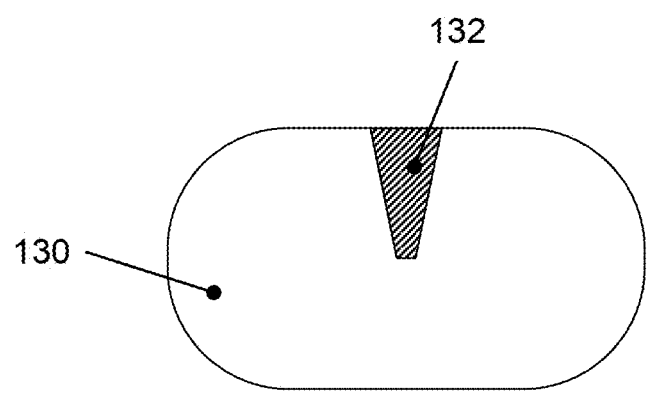
FIG. 6 shows an exemplary preform having a reversed temperature gradient after leaving a temperature-control apparatus.

As explained below with reference to FIGS. 5 and 6, the process steps 123 and 124 are coordinated with one another such that a reversal of the temperature gradient is obtained. In this case, FIG. 5 shows an exemplary preform 130 before entering the cooling apparatus 5 and FIG. 15 shows the preform 130 with a reversed temperature gradient after leaving the heating apparatus 6. While the blank is hotter inside than outside before the process step 123 (with a continuous temperature curve), it is hotter outside than inside after the process step 124 (with a continuous temperature curve). The wedges denoted by reference signs 131 and 132 symbolize the temperature gradients here, wherein the width of a wedge 131 or 132 symbolizes a temperature.

Figure 3:
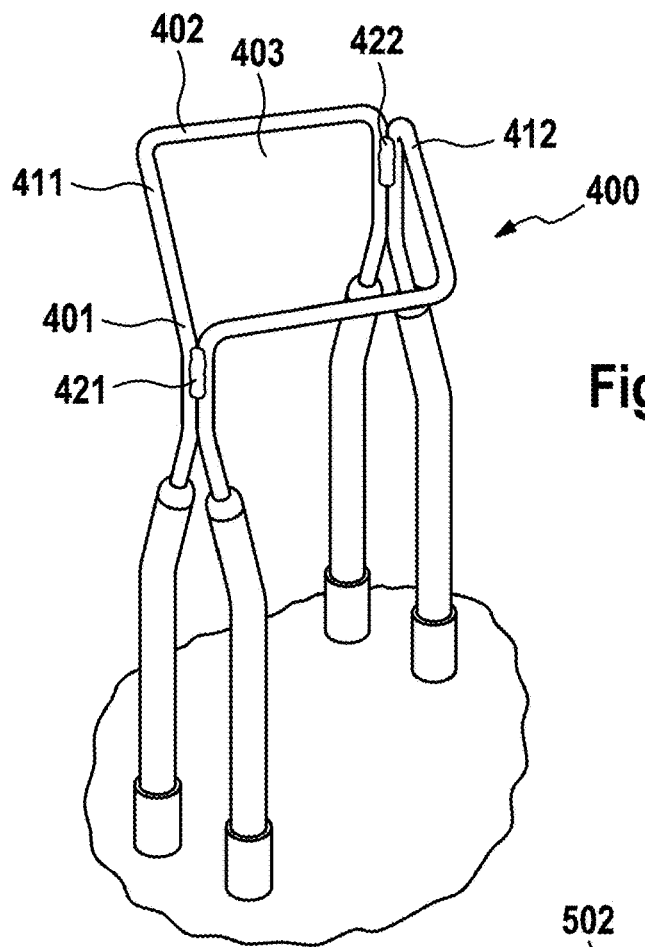
FIG. 3 shows an embodiment of a lance.
Figure 4:
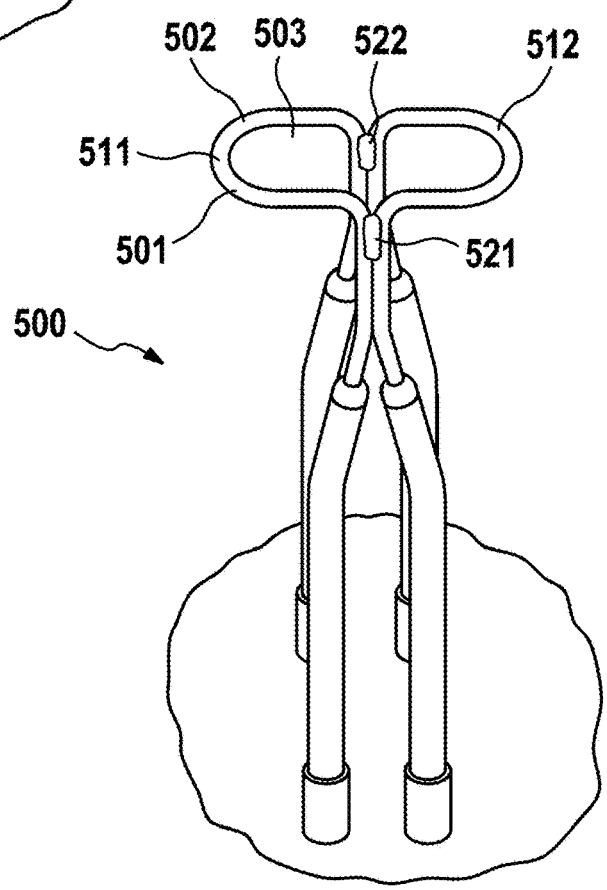
FIG. 4 shows another embodiment of a lance.

In order to reverse its temperature gradient, in one configuration, a preform resting on a cooled lance (not shown) is moved through the temperature-control device comprising the cooling apparatus 5 and the heating apparatus 6 (for example substantially continuously) or is held in one of the cooling apparatuses 5 and/or one of the heating apparatuses 6. A cooled lance is disclosed in DE 101 00 515 A1 and in DE 101 16 139 A1. Depending on the shape of the preform, FIGS. 3 and 4 show suitable lances, for example. For example, coolant flows through the lance in accordance with the counterflow principle. Alternatively or additionally, it may be provided that the coolant is additionally and/or actively heated.

For the term "lance", the term "support device" is also used in the following. The support device 400 shown in FIG. 3 comprises a carrier body 401 having a hollow cross section and an annular support surface 402. The carrier body 401 is tubular at least in the region of the support surface 402 and is uncoated at least in the region of the support surface 402. The diameter of the hollow cross section of the carrier body 401, at least in the region of the support surface 402, is no less than 0.5 mm and/or no greater than 1 mm. The external diameter of the carrier body 401, at least in the region of the support surface, is no less than 2 mm and/or no greater than 3 mm. The support surface 402 spans a square base surface 403 having rounded corners. The carrier body 401 comprises two flow channels 411 and 412 for the coolant flowing therethrough, which each only extend over a section of the annular support surface 402, wherein the flow channels 411 and 412 are connected in a region in which they leave the support surface 402 by means of metal filler material 421 and 422, for example solder.

The support device 500 shown in FIG. 4 comprises a carrier body 501 having a hollow cross section and an annular support surface 502. The carrier body 501 is tubular at least in the region of the support surface 502 and is uncoated at least in the region of the support surface 502. The diameter of the hollow cross section of the carrier body 501, at least in the region of the support surface 502, is no less than 0.5 mm and/or no greater than 1 mm. The external diameter of the carrier body 501, at least in the region of the support surface, is no less than 2 mm and/or no greater than 3 mm. The support surface 502 spans an oval base surface 503. The carrier body 501 comprises two flow channels 511 and 512 for the coolant flowing therethrough, which each only extend over a section of the annular support surface 502, wherein the flow channels 511 and 512 are connected in a region in which they leave the support surface 502 by means of metal filler material 521 and 522, for example solder.

It may be provided that, after passing through the cooling apparatus 5 (in the form of an annealing kiln), preforms are removed and are supplied by means of a transport apparatus 41, for example, to an intermediate storage unit (e.g. in which they are stored at room temperature). In addition, it may be provided that preforms are conducted to the transfer station 4 by means of a transport apparatus 42 and are phased into the continuing process by heating in the heating apparatus 6 (for example starting from room temperature).

In a departure from the method described with reference to FIG. 2A, in the method described with reference to FIG. 2B, the process step 121 is followed by the process step 122', in which the cast gob is transferred to an annealing kiln 49 of the device 1A, as shown in FIG. 1A, by means of a transfer station 4. In this sense, an annealing kiln is for example a conveying apparatus, such as a conveyor belt, through which a gob is guided and is cooled in the process, for example with the addition of heat. The cooling is carried out to a certain temperature above room temperature or to room temperature, wherein the gob is cooled down to room temperature in the annealing kiln 49 or outside the annealing kiln 49. It is for example provided that a gob rests on a base made of graphite or a base comprising graphite in the annealing kiln 49.

Figure 2B:
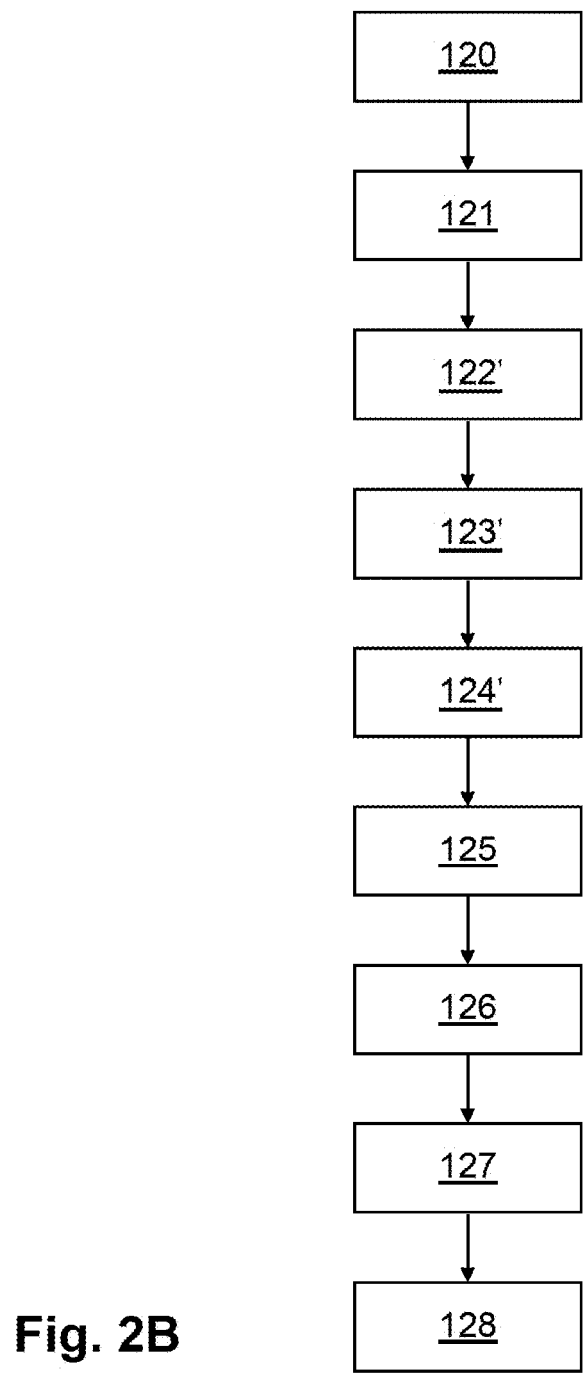
FIG. 2B shows an alternative sequence of a method for producing motor-vehicle headlight lenses or lens-like free-forms for a motor-vehicle headlight or optical elements made of glass.

In the subsequent process step 123' according to FIG. 2B, the gobs are supplied to a device 1B. The devices 1A and 1B may be in close proximity to one another, but may also be further away from one another. In the latter case, a transfer station 4A transfers the gobs from the annealing kiln 49 to a transport container BOX. The gobs are transported in the transport container BOX to the device 1B, in which a transfer station 4B removes the gobs from the transport container BOX and transfers them to a hood-type annealing furnace 5000. The gobs are heated in the hood-type annealing furnace 5000 (process step 124').

Figure 53:
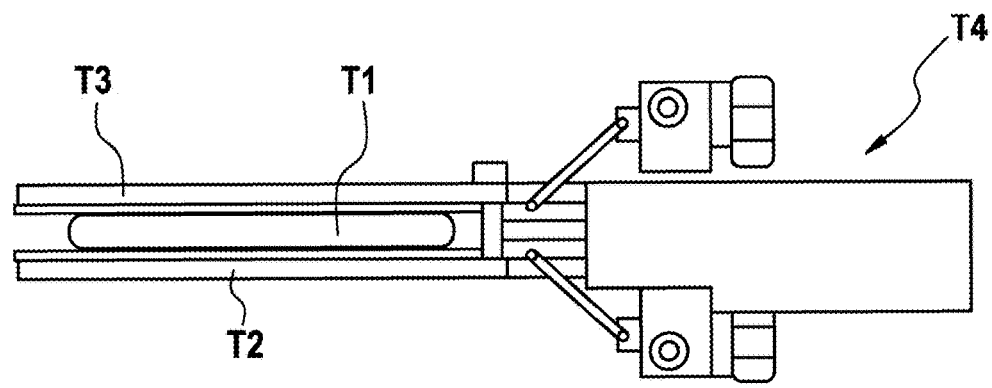
FIG. 53 shows a clamping assembly with a flat preform.

Flat gobs, wafers or wafer-like preforms can also be used to produce microlens arrays. Wafers of this kind may be square, polygonal or round, for example having a thickness of from 1 mm to 10 mm and/or a diameter of 4 inches to 5 inches. In a departure from the previously described method, these preforms are not heated on support devices, as shown in FIGS. 3 and 4, but are clamped, as shown in FIG. 53. In this case, the reference sign T1 denotes a flat preform or wafer and reference signs T2 and T3 denote clamping devices for clamping the flat preform T1 or wafer. In this clamping assembly T5 comprising the clamping devices T2 and T3, this flat preform is heated in a heating apparatus, such as the hood-type annealing furnace 5000. In this case, it may be provided that this preform T1 is not inserted into the heating apparatus from below, but instead from the side. Furthermore, it is for example provided that the clamped flat preform T1 rotates in the heating apparatus in order to prevent the flat preform T1 from bowing. In this process, the preform T1 is heated in the heating apparatus, for example while rotating, until the heated preform T1 can be pressed. The preform T1 is then placed onto a press mold (described in greater detail below) in a for example rotating movement, wherein the clamping devices T 2 and T 3 of the clamping assembly T 4 are opened such that the preform T1 rests on the press mold. During the pressing process, the clamping devices T 2 and T 3 remain in the press. After the pressing process, the clamping devices T 2 and T 3 grip the pressed preform T1 again and convey the preform T1 into a region outside the press.

Figure 24:
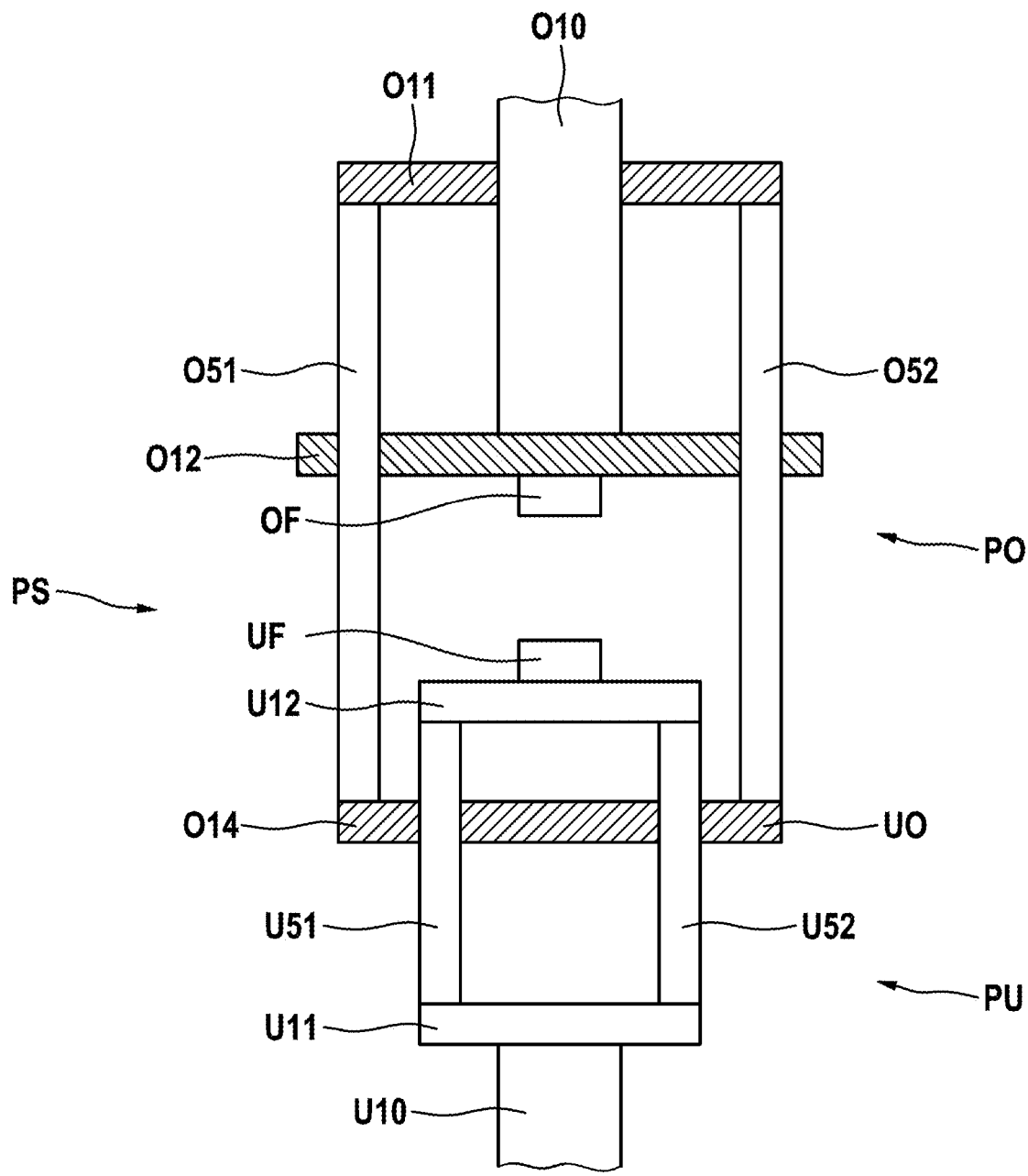
FIG. 24 is a schematic view of a pressing station for pressing a headlight lens from a heated blank.

A press 8, onto which a preform is transferred by means of a transfer station 7, is provided behind the heating apparatuses 6 or 5000. The preform is press-molded, for example on both sides, to form an optical element, such as the headlight lens 202, in a process step 125 by means of the press 8. A suitable mold set is disclosed e.g. in EP 2 104 651 B1. FIG. 24 is a schematic view of a pressing station PS for pressing an optical element from a heated blank. The pressing station PS is part of the press 8 according to FIGS. 1 and 1B. The pressing station PS comprises an upper pressing unit PO and a lower pressing unit PU. For the pressing, a mold OF (upper mold), which is moved by means of a press drive or by means of an actuator O10, and a mold UF (lower mold), which is moved by means of a press drive or by means of an actuator U10, are moved towards one another. The mold UF is connected to a mold-side movable connector U12, which is in turn connected to an actuator-side movable connector U11 by means of movable guide rods U51, U52. The actuator U10 is in turn connected to the actuator-side movable connector U11, such that the mold UF is movable by means of the actuator U10. The movable guide rods U51 and U52 extend through recesses in a fixed guide element UO such that any displacement or movement of the movable guide rods U51 and U52 and therefore of the mold UF perpendicularly to the movement direction is prevented or reduced or limited.

The pressing unit PO comprises an actuator O10, which moves the mold OF and is connected to a movable guide element O12. The pressing unit PO also comprises a frame, which is formed by an actuator-side fixed connector O11 and a mold-side fixed connector O14 as well as fixed guide rods O51 and O52, which connect the actuator-side fixed connector O11 to the mold-side fixed connector O14. The fixed guide rods O51 and O52 are guided through recesses in the movable guide element O12, such that they prevent, reduce or avoid any movement or deflection of the mold OF orthogonally to the movement direction of the actuator O10 or mold OF.

In the embodiment shown, the pressing units PO and PU are linked in that the fixed guide element UO is identical to the mold-side fixed connector O14. By linking or chaining the two pressing units PO and PU of the pressing station PS together, particularly high quality (for example in the form of contour accuracy) of the headlight lenses to be pressed is achieved.

Figure 25:
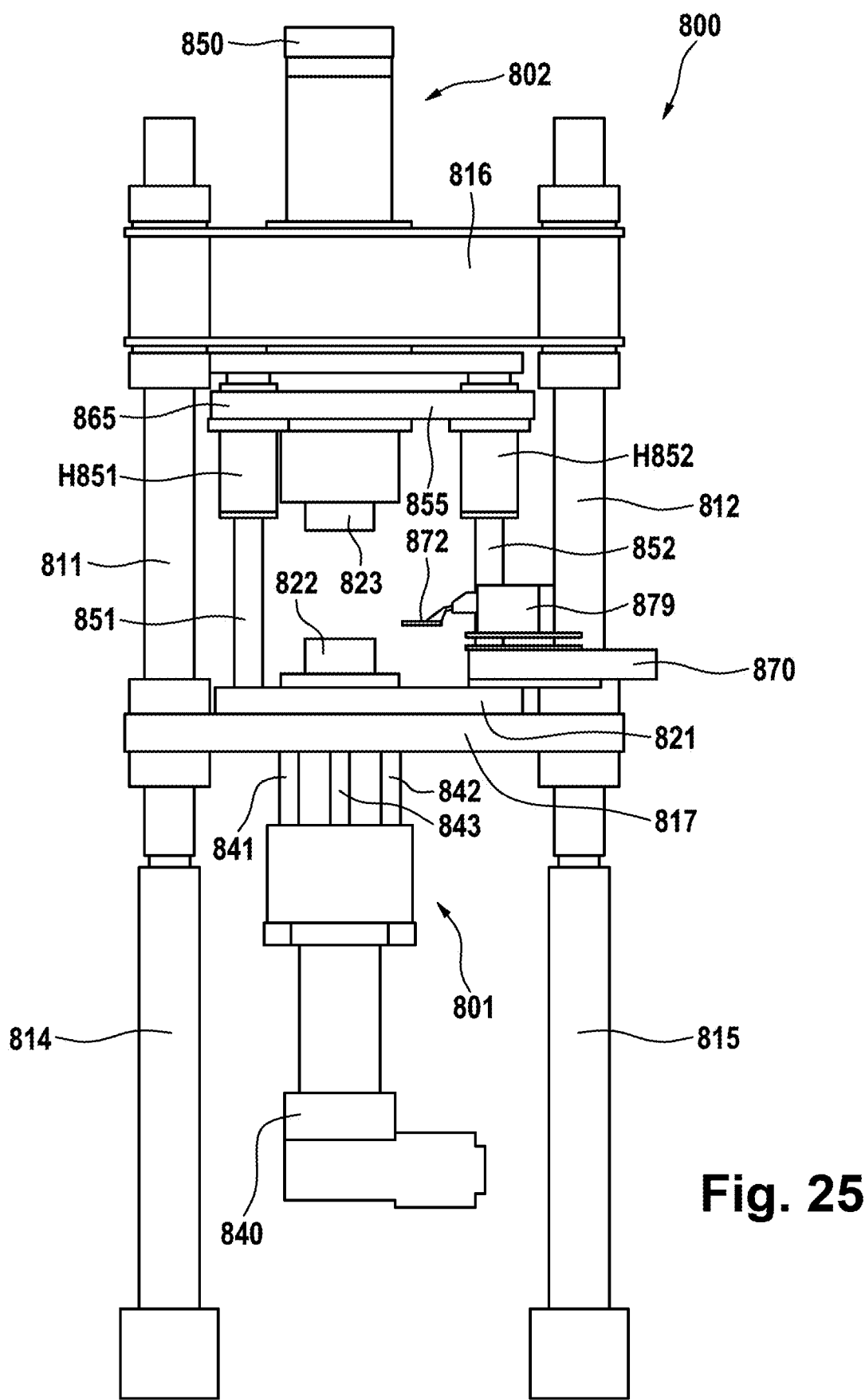
FIG. 25 shows another embodiment of a pressing station.

The pressing station 800 comprises a lower pressing unit 801 and an upper pressing unit 802 (see FIG. 25), wherein FIG. 25 shows an embodiment of a pressing station 800, by means of which optical elements, such as headlight lenses, can be pressed in a particularly preferable and suitable manner. The pressing station 800 is an embodiment of the pressing station PS from FIG. 24. The pressing unit 801 is an embodiment of the lower pressing unit PU in FIG. 24 and the pressing unit 802 is an embodiment of the upper pressing unit PO in FIG. 24. The pressing station 800 comprises a pressing frame, which, in an exemplary configuration, comprises the interconnected rods 811 and 814 as well as the interconnected rods 812 and 815. The rods 811 and 812 are interconnected by a lower plate 817 and an upper connection part 816 and thus form a pressing frame, which receives the lower pressing unit 801 and the upper pressing unit 802.

The lower pressing unit 801 comprises a press drive 840 corresponding to the actuator U10, by means of which drive three rods 841, 842, 843 are movable, in order to move a lower press mold 822 that is coupled to the rods 841, 842, 843 and corresponds to the mold UF. The rods 841, 842, 843 are guided through bores or holes (not shown) in the plate 817 and a plate 821, which prevent or considerably reduce a deviation or movement of the press mold 822 in a direction orthogonal to the movement direction. The rods 841, 842, 843 are embodiments of the movable guide rods U51 and U52 according to FIG. 24. The plate 817 is a configuration or implementation of the fixed guide element UO.

Figure 26:
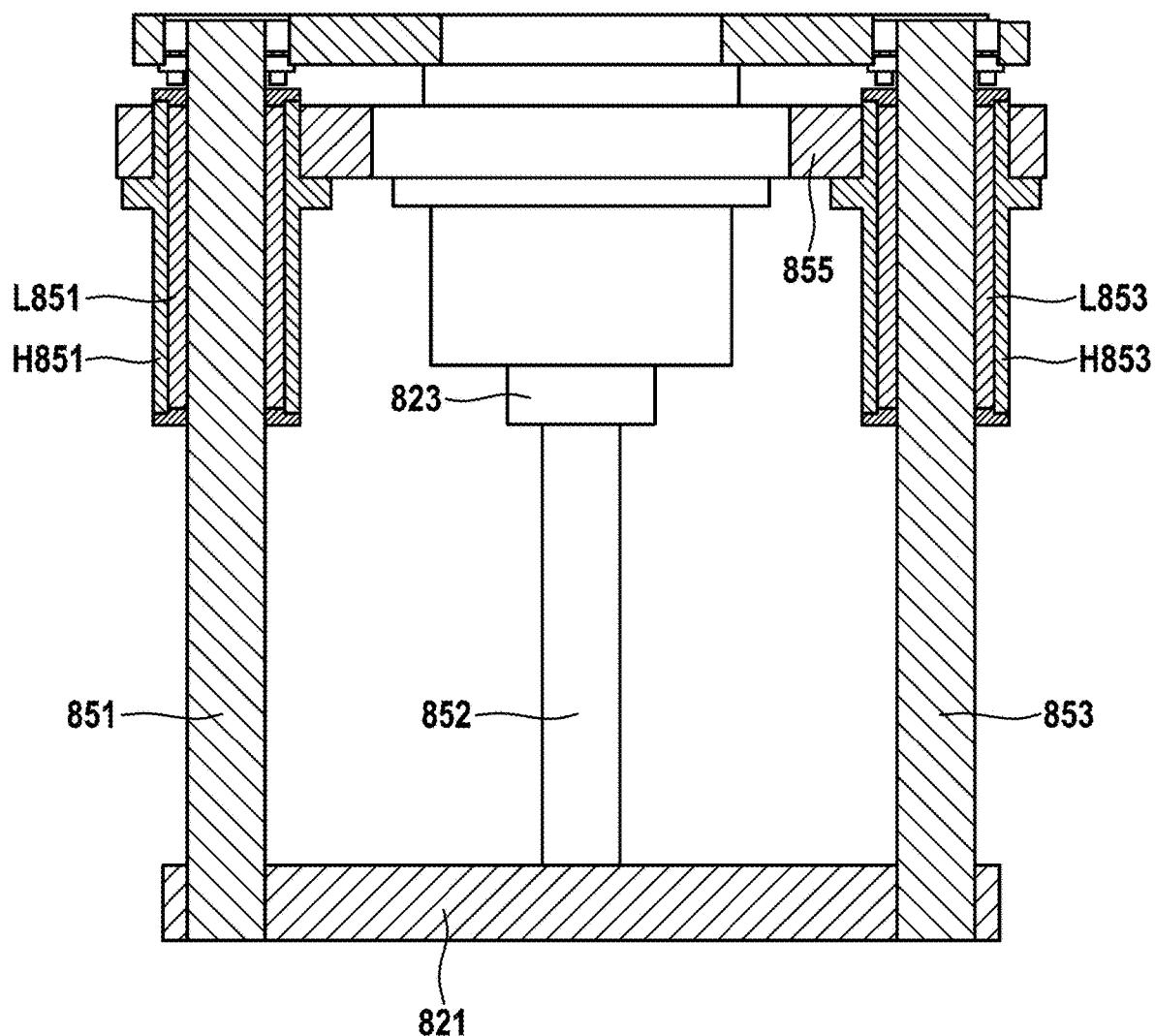
FIG. 26 shows a detail of a pressing station.

The upper pressing unit 802 shown in FIG. 26 comprises a press drive 850 which corresponds to the actuator O10 and is held by the upper connection part 816, which corresponds to the actuator-side fixed connector O11. A plate 855 which corresponds to the movable guide element O12 and comprises guide rods 851, 852 and 853 as well as an upper press mold 823 is guided by the press drive 850. The guide rods 851, 852 and 853 correspond to the fixed guide rods OS1 and OS2 in FIG. 24. The press mold 823 corresponds to the mold OF in FIG. 24. For the guidance, sleeves H851, H852 and H853 comprising bearings L851 and L853 are also provided as an implementation of the recesses in the movable guide plate O12 from FIG. 24, which surround the guide rods 851, 852 and 853. The plates 821 and 817 are fixed to one another and thus form the fixed guide element UO (plate 817) and the mold-side fixed connector O14 (plate 821).

Reference sign 870 denotes a movement mechanism by means of which an induction heater 879 comprising an induction loop 872 can be moved towards the lower mold 822 in order to heat it by means of the induction loop 872. After the heating by means of the induction loop 872, the induction heater 879 is moved back into its starting position again. A gob or preform is placed onto the press mold 822 and, by moving the press molds 822 and 823 towards one another, is press-molded (on both sides) to form a headlight lens.

Figure 27:
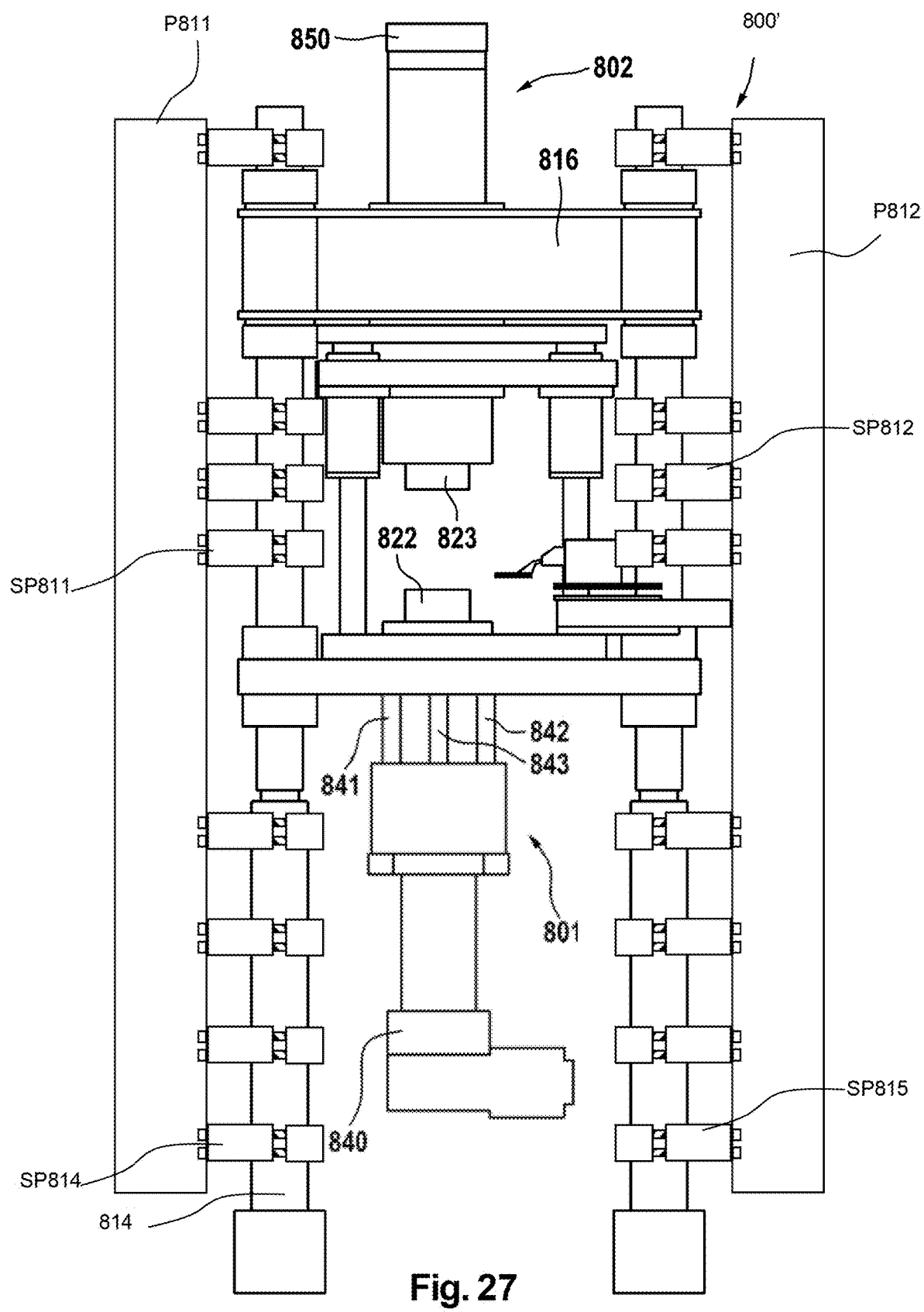
FIG. 27 is a schematic view of a pressing station, modified with respect to the pressing station according to FIG. 24, for pressing a headlight lens from a heated blank.
Figure 28:
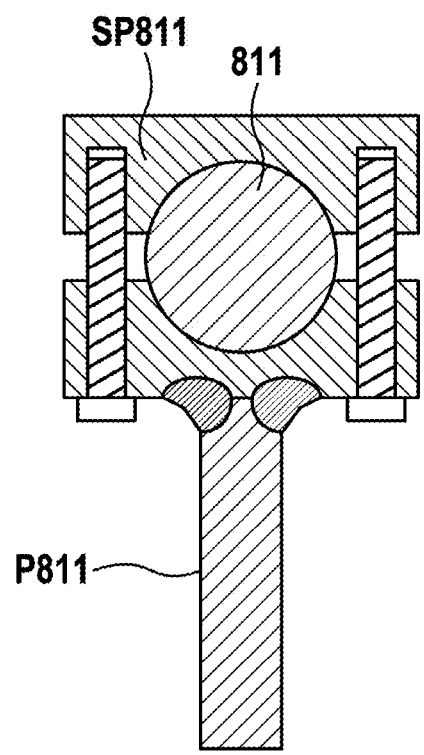
FIG. 28 is a view of a detail of the pressing station according to FIG. 27.

FIG. 27 shows another pressing station 800', likewise as an embodiment of the pressing station PS according to FIG. 24. In a modification to the pressing station 800, a reinforcement profile P811, P812 is for example provided for each of the rods 811, 812 or the rods 814, 815, wherein the reinforcement profile P811, P812 is connected to the rods 811, 812, 814, 815 by means of clamps SP811, SP812, SP814, SP815. FIG. 28 is, by way of example, a view of a detail of a clamp SP811 of this kind, wherein one half of the clamp is welded to the reinforcement profile P811.

Figure 29:
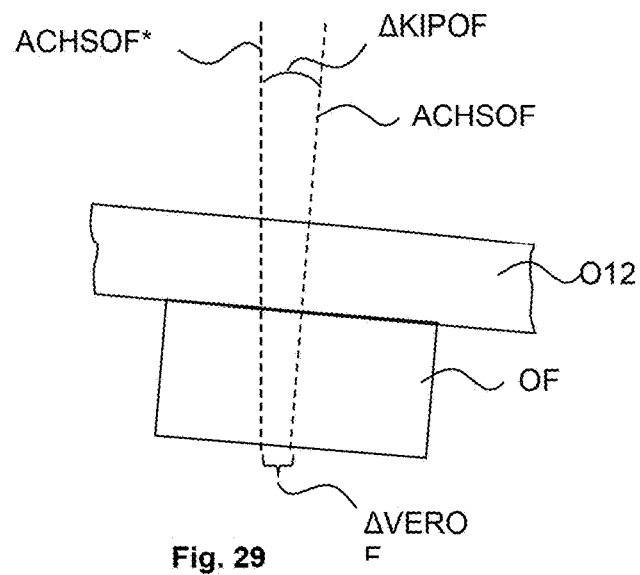
FIG. 29 is a schematic view for explaining tilting and radial offset relative to the upper mold.

The components are, for example, coordinated with one another and/or dimensioned such that the maximum tilting ΔKIPOF or the maximum angle of the tilting of the mold OF (corresponding to the angle between the target pressing direction ACHSOF* and the actual pressing direction ACHSOF), as shown in FIG. 29, is no greater than $10^{-2}$°, for example no greater than $5 \cdot 10^{-3}$°. Furthermore, it is provided that the radial offset ΔVEROF, i.e. the offset of the mold OF from its target position in the direction orthogonal to the target pressing direction ACHSOF*, is no greater than 50 μm, for example no greater than 30 μm, or no greater than 20 μm, or no greater than 10 μm.

Figure 30:
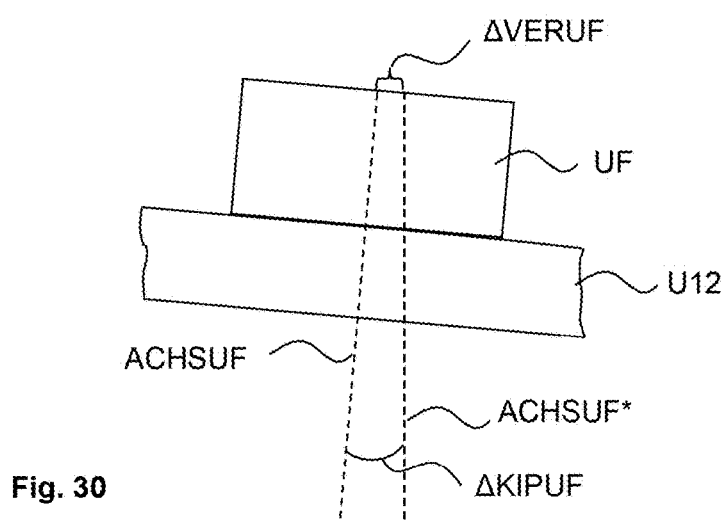
FIG. 30 is a schematic view for explaining tilting and radial offset relative to the lower mold.

The components are, for example, coordinated with one another and/or dimensioned such that the maximum tilting ΔKIPUF or the maximum angle of the tilting of the mold UF (corresponding to the angle between the target pressing direction ACHSUF* and the actual pressing direction ACHSUF), as shown in FIG. 30, is no greater than $10^{-2}$°, for example no greater than $5 \cdot 10^{-3}$°. Furthermore, it is provided that the radial offset ΔVERUF, i.e. the offset of the mold UF from its target position in the direction orthogonal to the target pressing direction ACHSUF*, is no greater than 50 μm, for example no greater than 30 μm, or no greater than 20 μm, or no greater than 10 μm.

Figure 31:
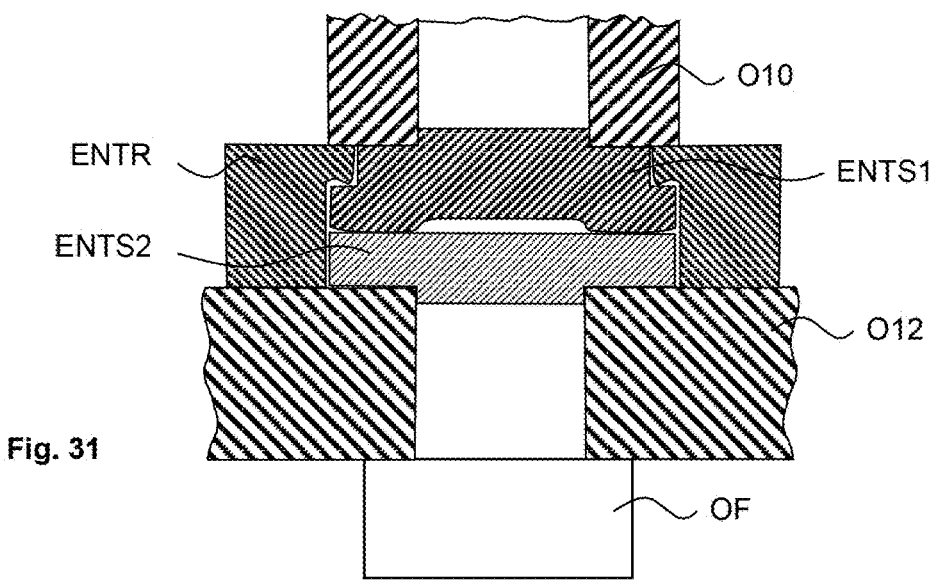
FIG. 31 shows an embodiment of a decoupling element for torsion.

Additionally or alternatively, it may be provided that the actuator O10 is decoupled from torsion from the movable guide element O12 comprising the mold OF. In addition, it may be provided that the actuator U10 is also decoupled from torsion from the mold-side movable connector U12 together with the mold UF. FIG. 31 shows decoupling of this kind on the basis of the example of decoupling the actuator O10 from the mold OF together with the movable guide element θ12. The decoupler, which comprises the ring ENTR and the discs ENTS1 and ENT2, prevents any torsion from the actuator O10 acting on the mold OF.

Figure 32:
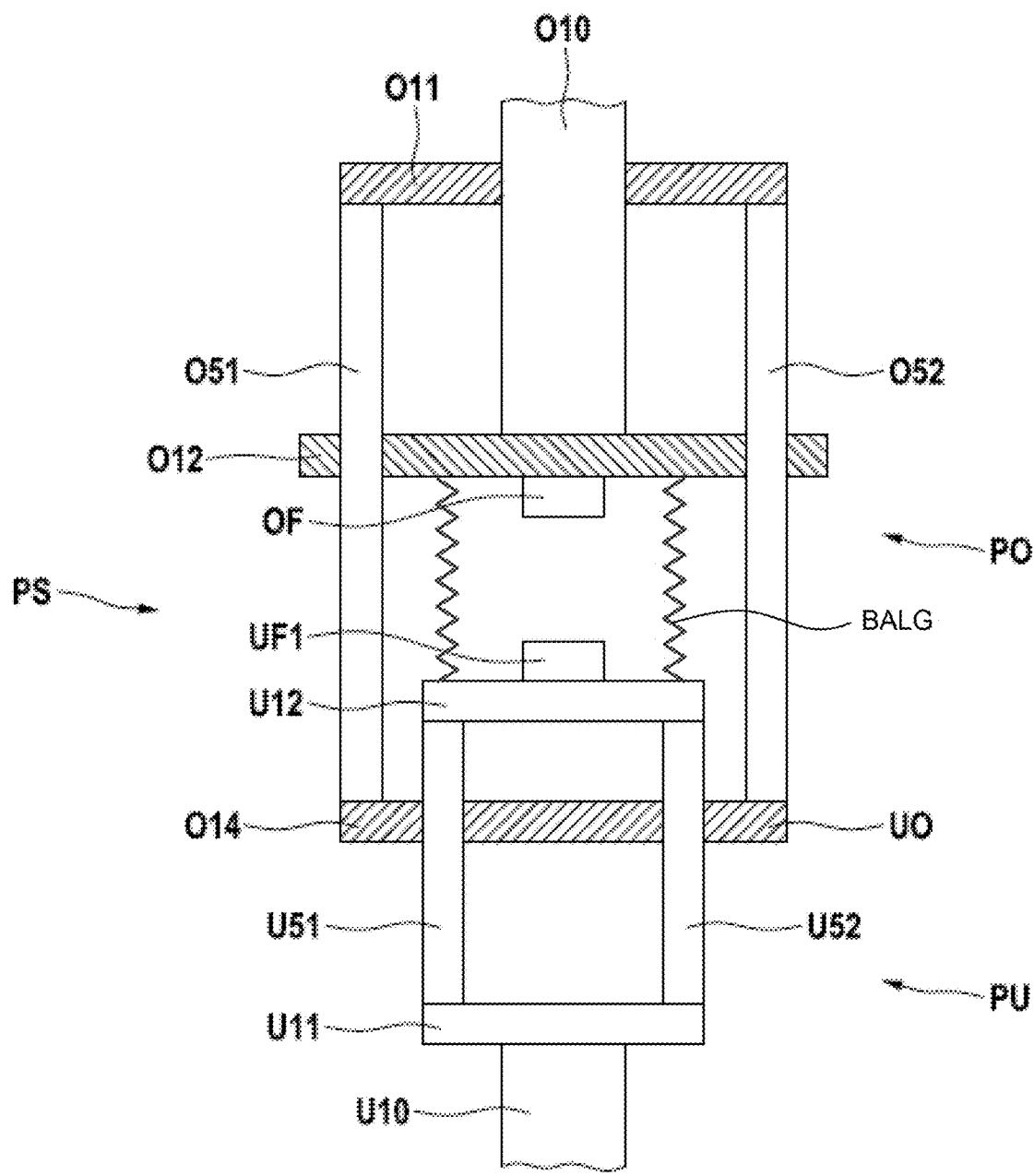
FIG. 32 shows an embodiment of a modification of the pressing station according to FIGS. 24, 25, 26, 27 and 28 for pressing under vacuum or near vacuum or negative pressure, explained on the basis of a modified representation of the schematic view according to FIG. 24.

The method described may also be carried out in connection with pressing under vacuum or near vacuum or at least under negative pressure in a chamber, as disclosed by way of example in JP 2003-048728 A. The method described may also be carried out in connection with pressing under vacuum or near vacuum or at least under negative pressure by means of a bellows, as explained in the following on the basis of the pressing station PS in FIG. 32 by way of example. In this case, it is provided that a bellows BALG is provided or arranged between the movable guide element O12 and the mold-side movable connector U12 for closing the molds OF and UF in an airtight manner or at least in a substantially airtight manner. Suitable methods are for example disclosed in the above-mentioned JP 2003-048728 A (incorporated by reference in its entirety) and in WO 2014/131426 A1 (incorporated by reference in its entirety). In a corresponding configuration, a bellows may be provided, as disclosed in WO 2014/131426 A1, at least in a similar manner. It may be provided that the pressing of an optical element, such as a headlight lens, is carried out by means of at least one lower mold UF and at least one upper mold OF, (a) wherein the heated preform or blank or gob 4001 (glass) is placed in or on the lower mold UF, (b) wherein (subsequently or thereafter) the upper mold OF and the lower mold UF (are positioned relative to one another and) are moved towards one another without the upper mold OF and the lower mold UF forming a closed overall mold (for example far enough that the distance (for example the vertical distance) between the upper mold and the blank is no less than 4 mm and/or no greater than 10 mm), (c) wherein (subsequently or thereafter) the bellows BALG for producing an airtight space, in which the upper mold OF and the lower mold UF are arranged, is closed, (d) wherein (subsequently or thereafter) a vacuum or near vacuum or negative pressure is generated in the airtight space, (e) wherein (subsequently or thereafter) the upper mold OF and the lower mold UF are moved towards one another (for example vertically) for (blank) pressing the optical lens element (for example on both sides or all sides), wherein it is for example provided that the upper mold OF and the lower mold UF contact one another or form a closed overall mold (in this case, the upper mold OF and the lower mold UF can be moved towards one another such that the upper mold OF is moved (vertically) towards the lower mold UF and/or the lower mold UF is moved (vertically) towards the upper mold OF), (f) wherein subsequently or thereafter normal pressure is generated in the airtight space, (g) wherein subsequently or thereafter, in another exemplary configuration, the seal is opened or returned to its starting position, (h) and wherein subsequently or thereafter or during steps f) and/or g), the upper mold OF and the lower mold UF are moved away from one another.

In another exemplary configuration, before pressing the optical element, such as a headlight lens (or between step (d) and step (e)), a predetermined waiting time is allowed to elapse. In another exemplary configuration, the predetermined waiting time is no greater than 3 seconds (minus the duration of step (d)). In another exemplary configuration, the predetermined waiting time is no less than 1 second (minus the duration of step (d)).

Figure 7:
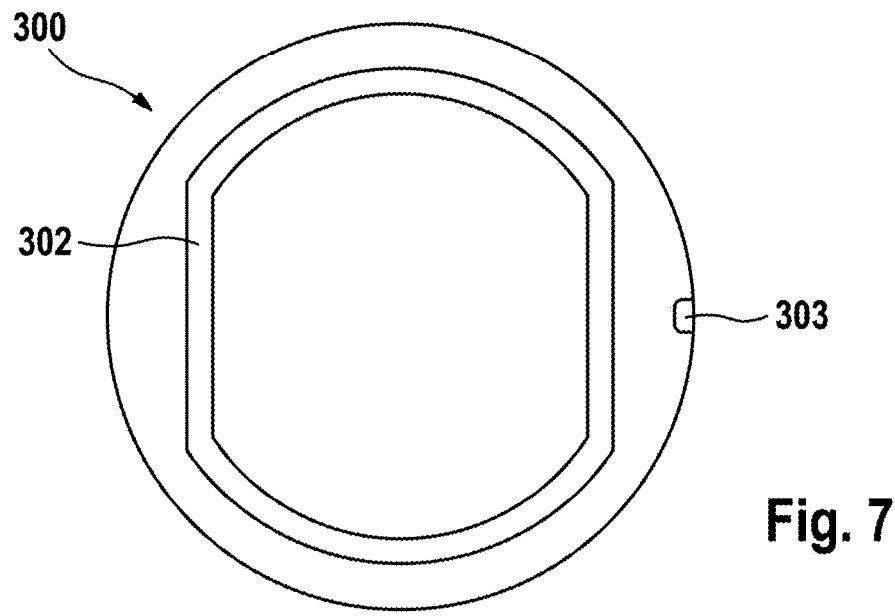
FIG. 7 shows an embodiment of a transport element.
Figure 10:
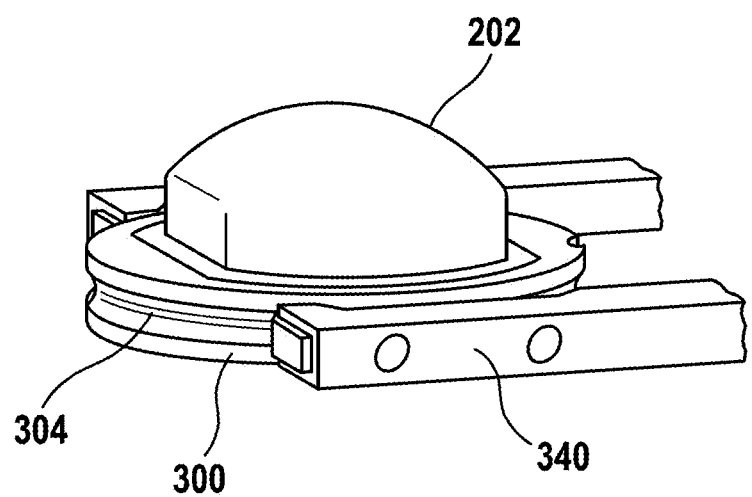
FIG. 10 shows a headlight lens on a transport element according to FIG. 7.
Figure 38:
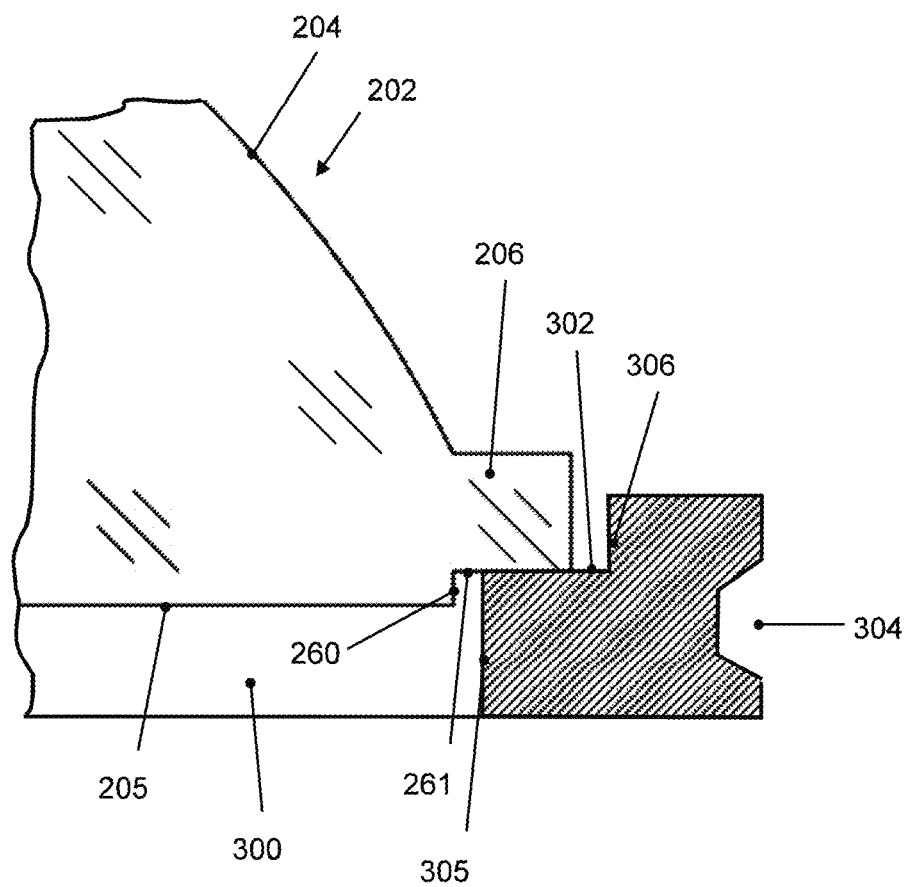
FIG. 38 shows the detail according to FIG. 37 with a detail of the transport element (in cross section)

Following the pressing, the optical element (such as a headlight lens) is placed on a transport element 300 as shown in FIG. 7 by means of a transfer station 9. The annular transport element 300 shown in FIG. 7 consists of steel, for example of ferritic steel or martensitic steel. The annular transport element 300 comprises, on its inner face, a (corresponding) support surface 302, on which the optical element to be cooled, such as the headlight lens 202, is placed by its edge, such that the optical surfaces, such as the surface 205, are prevented from being damaged. Therefore, the (corresponding) support surface 302 and the support surface 261 of the lens edge 206 thus e.g. come into contact, as shown in FIG. 38, for example. Here, FIGS. 10 and 38 show the fixing and orientation of the headlight lens 202 on the transport element 300 by means of a limiting surface 305 or a limiting surface 306. The limiting surfaces 305 and 306 are orthogonal to the (corresponding) support surface 302, for example. In this case, it is provided that the limiting surfaces 305, 306 have enough play relative to the headlight lens 202, such that the headlight lens 202 can be placed on the transport element 300 for example without the headlight lens 202 becoming tilted or jammed on the transport element 300.

Figure 11:
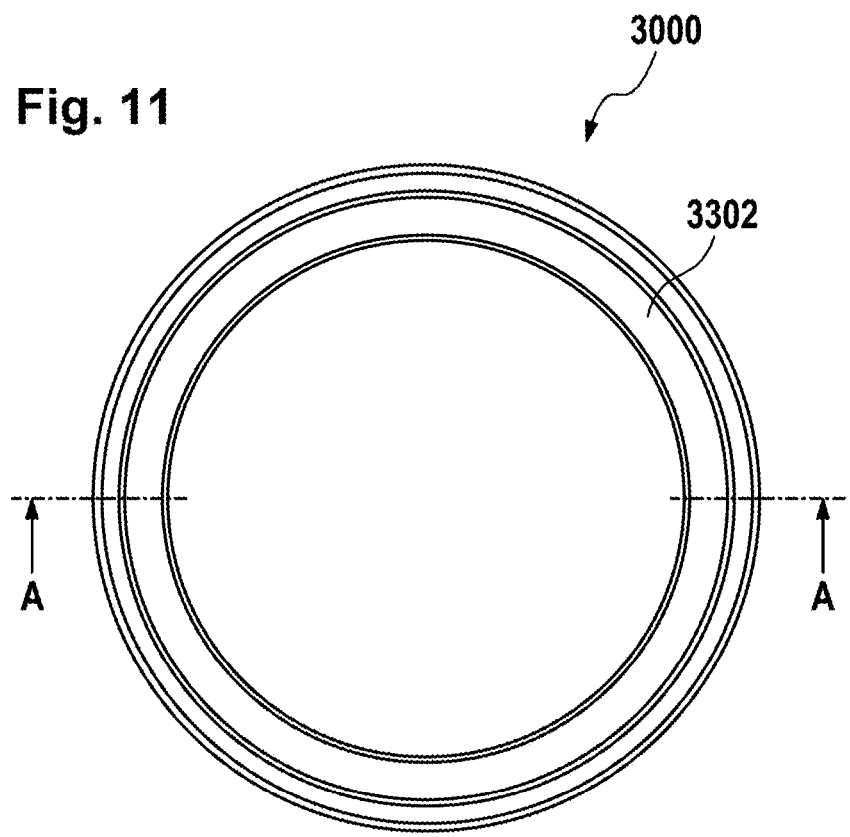
FIG. 11 shows another embodiment of a transport element.
Figure 12:
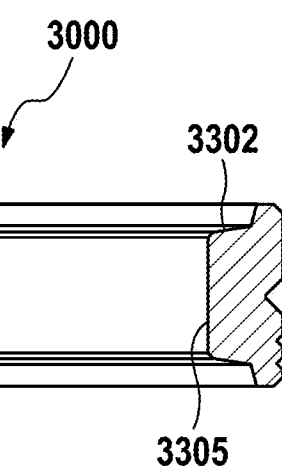
FIG. 12 is a cross section through the transport element according to FIG. 11.

FIG. 11 shows a transport element 3000 which is designed in an alternative manner to the transport element 300 and is shown in FIG. 12 in a cross-sectional view. Unless described otherwise, the transport element 3000 is designed to be similar or identical/analogous to the transport element 300. The transport element 3000 (likewise) comprises limiting surfaces 3305 and 3306. In addition, a support surface 3302 is provided, which, however, in a modification to the support surface 302, is designed to slant towards the midpoint of the transport element 3000. It is for example provided that the limiting surfaces 3305 and 3306 have enough play relative to the headlight lens 202, wherein particularly precise orientation is achieved by the slope of the support surface 3302. Moreover, the transport element 3000 is handled in an analogous manner to the following description of the handling of the transport element 300. The angle of the slant or slope of the support surface 3302 relative to the orthogonal of the rotational axis or when used as intended relative to the support plane is between 5° and 20°, and in the embodiment shown is 10°.

Figure 8:
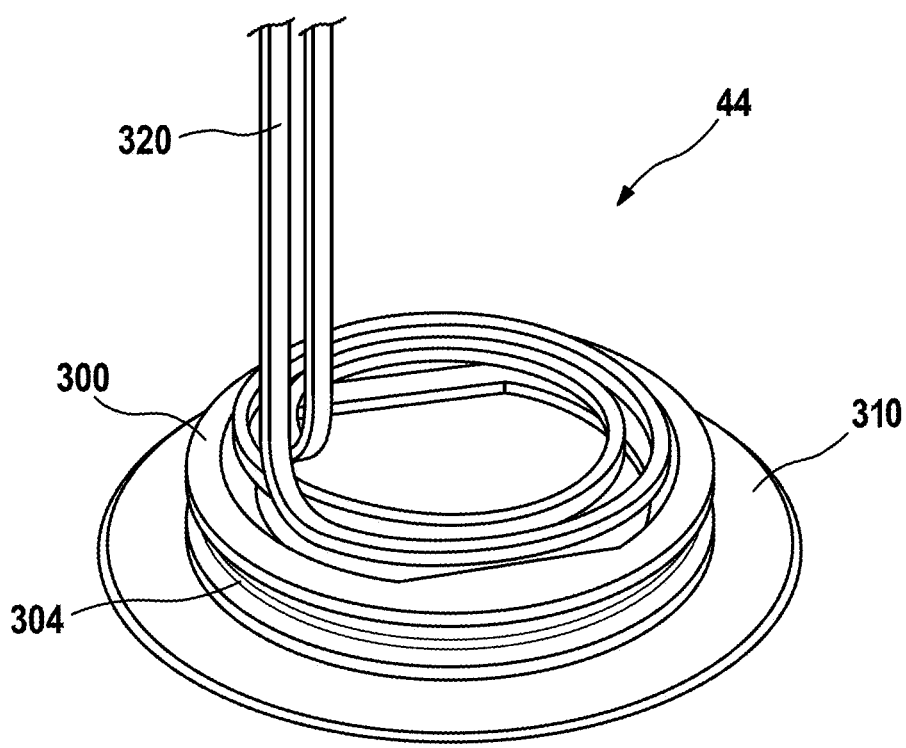
FIG. 8 shows an embodiment of a heating device for a transport element according to FIG. 7.
Figure 9:
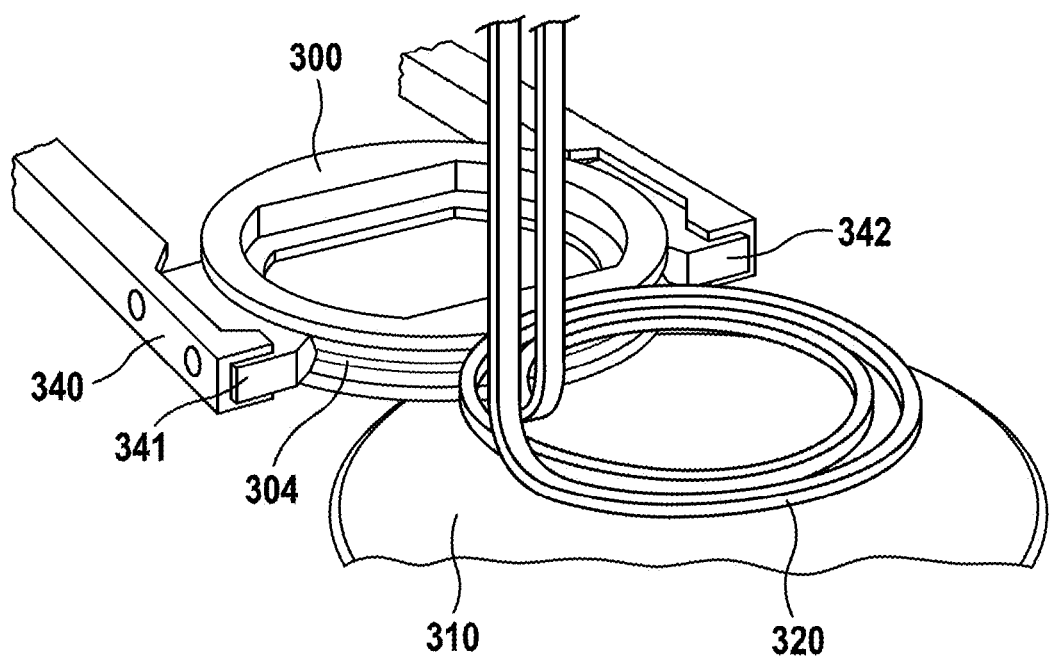
FIG. 9 shows an embodiment for removing a transport element according to FIG. 7 from a heating station according to FIG. 8.

In addition, before placing the headlight lens 202 on the transport element 300, the transport element 300 is heated such that the temperature of the transport element 300 is approximately +−50 K the temperature of the headlight lens 202 or the edge 206. For example, the heating is carried out in a heating station 44 by means of an induction coil 320, as shown in FIGS. 8 and 9. In these figures, the transport element 300 is placed on a support 310 and for example is heated by means of the induction coil/induction heater 320 at a heating rate of 30-50 K/s, for example in less than 10 seconds. The transport element 300 is then grasped by a gripper 340, as shown in FIGS. 9 and 10. For this purpose, the transport element 300 for example also has an indentation 304 on its outer edge, which is designed to be circumferential in one configuration. For correct orientation, the transport element 300 comprises a marker slot 303. The transport element 300 is guided to the press 8 by means of the gripper 340 and, as shown in FIG. 10, the headlight lens 202 is transferred from the press 8 to the transport element 300 and placed thereon.

In a suitable configuration, it is provided that the support 310 is designed as a rotatable plate. The transport element 300 is thus placed on the support 310 designed as a rotatable plate by hydraulic and automated movement units (e.g. by means of the gripper 340). Centering is then carried out by two centering jaws 341 and 342 of the gripper 340 and specifically such that the transport elements are oriented in a defined manner by means of the marker slot 303, which is or can be detected by means of a position sensor. Once this transport element 300 has reached its linear end position, the support 340 designed as a rotatable plate begins to rotate until a position sensor has detected the marker slot 303.

Figure 33:
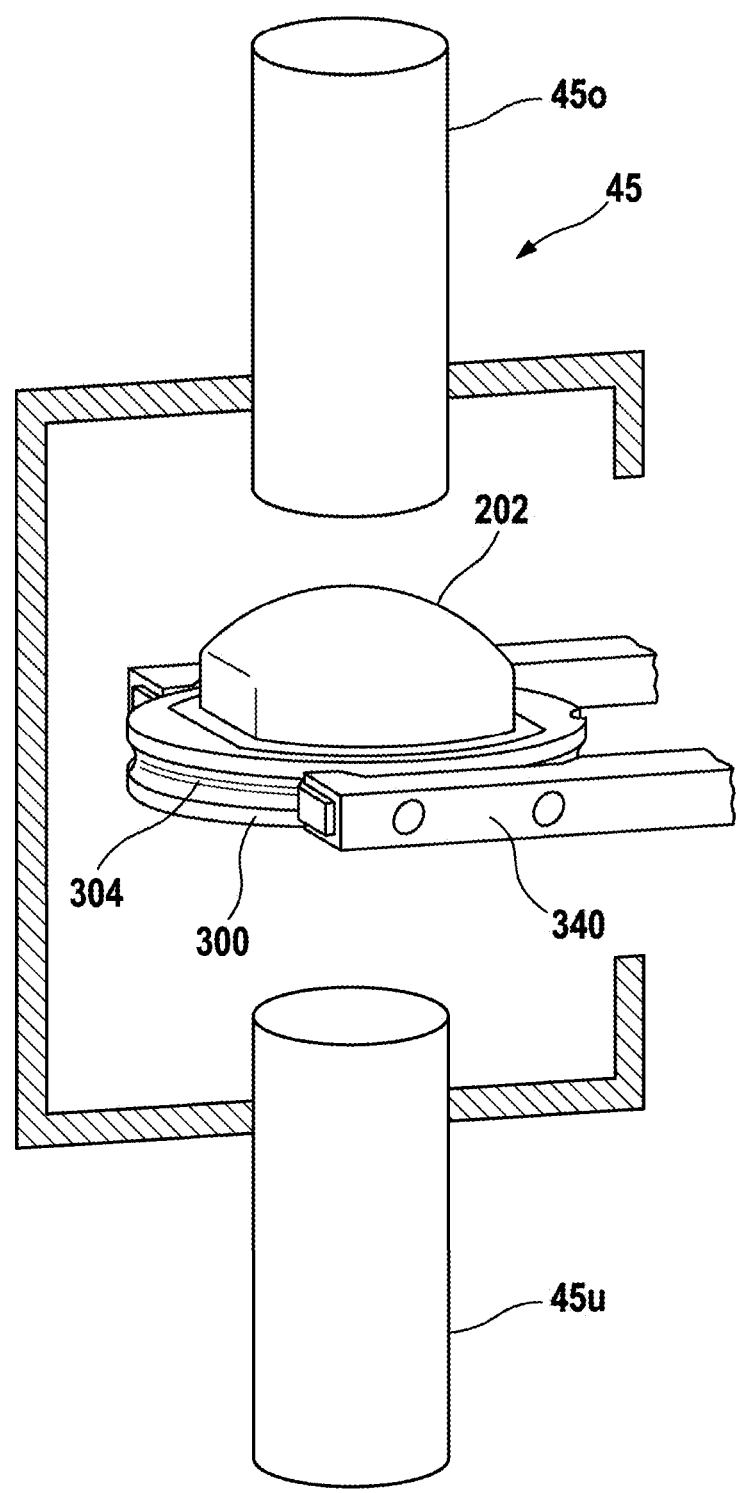
FIG. 33 is a cross-sectional view of an embodiment of a surface-treatment station.

In a process step 126, an optical element or the headlight lens 202 is moved through a surface-treatment station 45 according to FIG. 33 on the transport element 300. In this figure, the optically active surface 204 of the headlight lens 202 is sprayed with surface-treatment agent by means of a dual-substance nozzle 45o and at least one optically active surface of the optical element, such as the optically active surface 205 of the headlight lens 202, is sprayed with surface-treatment agent by means of a dual-substance nozzle 45u. The spraying process lasts no longer than 12 seconds, for example no longer than 8 seconds, for example no less than 2 seconds. The dual-substance nozzles 45o and 45u each comprise an inlet for atomizing air and an inlet for liquid, in which the surface-treatment agent is supplied, which is converted into a mist or spray mist by means of the atomizing air and exits through a nozzle. In order to control the dual-substance nozzles 45o and 45u, a control air port is also provided, which is actuated by means of a control assembly 15 described in the following.

By means of the proposed method for producing an optical element or a headlight lens, weather resistance and/or hydrolytic resistance comparable to that of borosilicate glass is obtained. Furthermore, the costs of the production process are only slightly higher than those of the production process for optical elements or headlight lenses having weather resistance and/or hydrolytic resistance corresponding to soda-lime glass.

Figure 13:
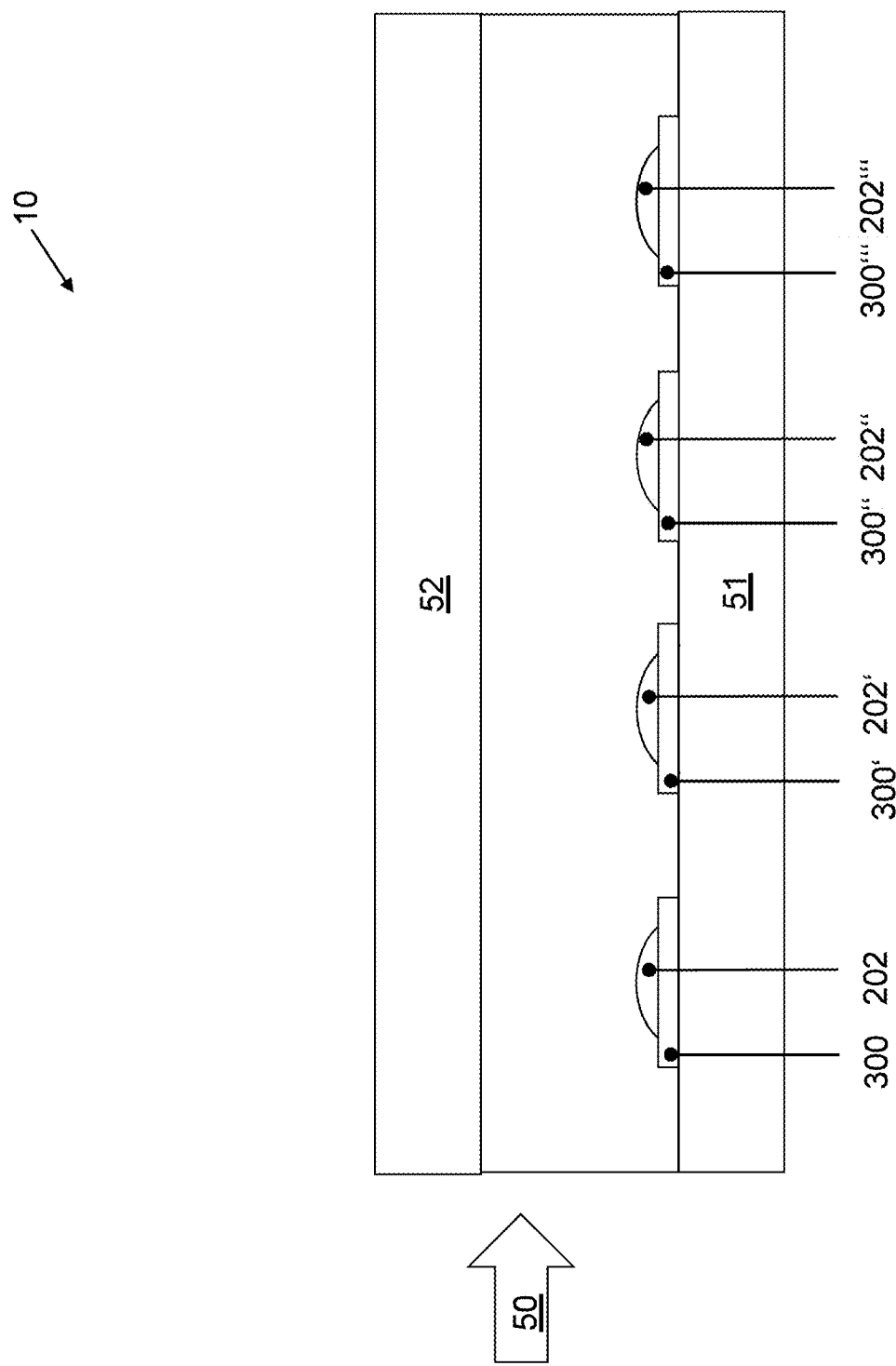
FIG. 13 is a schematic view of an embodiment of an annealing kiln.

The transport element 300 together with the headlight lens 202 is then placed on the annealing kiln 10. In a process step 127, the headlight lens 202 is cooled by means of the annealing kiln 10. FIG. 13 is a detailed schematic view of the exemplary annealing kiln 10 from FIG. 1. The annealing kiln 10 comprises a tunnel which is or can be heated by means of a heating apparatus 52 and through which the headlight lenses 202, 202', 202", 202"' are moved slowly on transport elements 300, 300', 300", 300"' in the movement direction indicated by an arrow 50. In this process, the heating power decreases in the movement direction of the transport elements 300, 300', 300", 300"' together with the headlight lenses 202, 202', 202", 202"'. For moving the transport elements 300, 300', 300", 300"' together with the headlight lenses 202, 202', 202", 202"', a conveyor belt 51 is e.g. provided, for example made up of chain members or implemented as a series of rollers.

At the end of the annealing kiln 10, a removal station 11 is provided, which removes the transport element 300 together with the headlight lens 202 from the annealing kiln 10. In addition, the removal station 11 separates the transport element 300 and the headlight lens 202 and transfers the transport element 300 to a return transport apparatus 43. From the return transport apparatus 43, the transport element 300 is transferred by means of the transfer station 9 to the heating station 44, in which the transport element 300 is placed on the support 310 designed as a rotatable plate and is heated by means of the induction heater 320.

A process step 128 lastly follows, in which residues of the surface-treatment agent on the lens are washed away in a washing station 46.

It is for example provided that the optical element or lens has a transmission of greater than 90% after washing.

Figure 54:
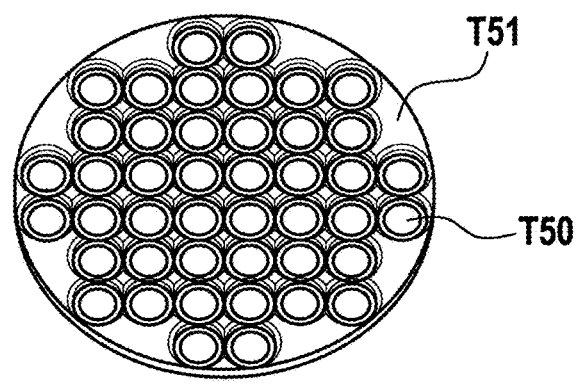
FIG. 54 shows a microlens array comprising a round carrier.

It may be provided that, with reference to the heating of a flat gob, microlens arrays are pressed, which are not used as an array, but instead their individual lenses are used. An array of this kind is for example shown in FIG. 54, which shows a large number of individual lenses T50 on an array T51, which have been generated by pressing. In such a case, it is provided that the individual lenses T 50 of the array T 51 are separated.

The device shown in FIG. 1 also comprises a control assembly 15 for controlling and/or regulating the device 1 shown in FIG. 1. The device 1A shown in FIG. 1A also comprises a control assembly 15A for controlling and/or regulating the device 1A shown in FIG. 1A. The device 1B shown in FIG. 1B also comprises a control assembly 15B for controlling and/or regulating the device 1B shown in FIG. 1B. The control assemblies 15, 15A and 15B for example ensure that the individual process steps are continuously interlinked.

The elements in FIGS. 1, 1A, 1B, 5, 6, 13, 24, 27, 28, 29, 30, 32, 33, 34, 38, 39, 42, 43, 44 and 45, 46, 47, 52, 53 and 54 are not necessarily shown to scale for the sake of simplicity and clarity. Therefore, for example, the scales of some elements are exaggerated compared with other elements in order to improve the understanding of the embodiments of the present disclosure.

The claimed or disclosed method makes it possible to extend the scope of application of press-molded lenses, for example in relation to objective lenses, projection displays, microlens arrays and/or vehicle headlights, for example adaptive vehicle headlights.

LIST OF REFERENCE SIGNS 1, 1A, 1B device
2 melting unit
2B adjustable outlet
3 preform device
4, 4A, 4B transfer station
5A, 5B, 5C cooling apparatuses
6A, 6B, 6C heating apparatuses
7 transfer station
8 pressing station
9 transfer station
10 annealing kiln
11 removal station
15, 15A, 15B control assembly
20 motor vehicle
41 transport apparatus
42 transport apparatus
43 return transport apparatus
44 heating station
45 surface-treatment station
45o dual-substance nozzle
45u dual-substance nozzle
46 washing station
50 arrow
51 conveyor belt
52 heating apparatus
120 process step
121 process step
122, 122' process step
123, 123' process step
124, 124' process step
125 process step
126 process step
127 process step
128 process step
130 preform
131 temperature gradient
132 temperature gradient
201, 201', 201" motor-vehicle headlight
202 headlight lens
203 lens body
204 substantially convex (for example optically active) surface
205 substantially planar (for example optically active) surface
206 lens edge
210 light source
212 reflector
214 light stop
215 edge
220 cut-off line
230 optical axis of 202
260 step of 206
261 surface of the lens edge 206
300, 3000 transport element
302, 3302 support surface
303 marker slot
304 indentation
305, 3305 limiting surface
306, 3306 limiting surface
310 support
320 induction coil/induction heater
340 gripper
341, 342 centering jaws
400, 500 support devices
401, 501 carrier body
402, 502 support surface
403, 503 base surface
411, 511 flow channels
412, 512 flow channels
421, 521 metal filler material
422, 522 metal filler material
800 pressing station
801 pressing unit
802 pressing unit
811, 812, 814, 815 rod
816 upper connection part
817 lower plate
821 plate
822 lower press mold
823 upper press mold
840 press drive
841, 842, 843 rods
850 press drive
851, 852, 853 guide rod
H851, H852, H853 sleeves
L851, L853 bearing
855 plate
870 movement mechanism
872 induction loop
879 induction heater
4001 gob
4002 nut
5000 hood-type annealing furnace
5001 heating coil
5002, 5202, 5302 protective cover
5112, 5212, 5312 cylindrical region
5132 rounded region
5122, 5222, 5322 covering region
5242, 5342 conical region
5232, 5332 curvature
DA diameter of 204
DB diameter of 205
DBq orthogonal diameter to DB
DL diameter of 202
DLq orthogonal diameter to DL
F2 surround sensor system
F3 controller
F4 illumination device
F5 objective lens
F20, F201 vehicle headlight
F41 light-source assembly
F42 front optics
F421 light exit surface of F4
L4 light
L41 light directed into F42
L5 illumination pattern
V1 front optics array
V2 front optics
V11, V12, V13, V14, V15 front optics V20 base part
V21 surface of V20
V111, V121, V131,
V141, V151 light entry surface
V115, V125, V135,
V145, V155 side surfaces
V2011, V2012, V2013,
V2014, V2015 lenses
V11
VL light-source assembly
M2 surround sensor system
M3 controller
M4 light-emission unit
ML4 light
M5 concave lens
ML5 further-shaped light
M6 projection optics
ML6 resulting light distribution
G20, M20 headlight
G2 surround sensor system
G3 controller
G4 controller
G5 illumination device
GL5 light generated by GL5
G6 system of micromirrors
GL6 illumination pattern
G7 projection optics
GL7 light
$P_{max}$, $P_{min}$ luminous power
PS pressing station
PO upper pressing unit
PU lower pressing unit
OF upper mold
UF lower mold
U10, O10 actuator
U11, U12 movable connector
U51, U52 movable guide rods
UO fixed guide element
O11 actuator-side connector
O12 movable guide element
O14 mold-side connector
O51, O52 fixed guide rods
P811, P812 reinforcement profile
SP811, SP812,
SP814, SP815 clamps
ΔKIPOF, ΔKIPUF maximum tilting
ACHSOF, ACHSUF actual pressing direction
ACHSOF*, ACHSUF* target pressing direction
ΔVEROF, ΔVERUF
ENTR ring
ENTS1, ENTS2 discs
BALG bellows
T1 preform
T2, T3 clamping devices
T4 clamping assembly

The invention claimed is:

1. A method of producing a headlight lens, the method comprising:
heating a blank made of soda-lime glass;
providing a surface-treatment agent which comprises a solvent and a solid dissolved in the solvent, wherein the solid comprises at least one solid from the group consisting of aluminum, aluminum chloride, aqueous aluminum chloride, aluminum salt, fatty-acid aluminum salts, phosphate, potassium phosphate, sodium phosphate, $KO_2$, $KOH$, $KNO_3$, silicate, $SiO_2$, potassium silicate and potassium;
providing a gas;
generating a spray mist by thoroughly mixing the surface-treatment agent with the gas;
providing a first mold;
providing at least a second mold;
providing a cooling path;
press-molding the heated blank to form a headlight lens having at least a first optically active surface by means of the first mold and the at least a second mold;
spraying the at least first optically active surface with the spray mist; and
cooling the headlight lens in accordance with a cooling regime in the cooling path by adding heat.

2. The method according to claim 1, wherein the solid comprises fatty-acid aluminum salts.

3. The method according to claim 1, wherein the solid comprises phosphate.

4. The method according to claim 1, wherein the gas comprises compressed air.

5. The method according to claim 4, wherein the surface-treatment agent comprises, based on the total mass of the surface-treatment agent, 25 to 65 wt. % water, 30 to 70 wt. % potassium phosphate, 1 to 8 wt. % sodium phosphate and 0.001 to 0.010 wt. % aluminum, wherein the constituents do not add up to more than 100%.

6. The method according to claim 4, wherein the surface-treatment agent comprises, based on the total mass of the surface-treatment agent, 25 to 65 wt. % water.

7. The method according to claim 4, wherein the surface-treatment agent comprises, based on the total mass of the surface-treatment agent, 30 to 70 wt. % potassium phosphate.

8. The method according to claim 4, wherein the temperature of the optically active surface during spraying with surface-treatment agent is no less than TG and no greater than TG+150 K, wherein TG denotes the glass transition temperature.

9. The method according to claim 4, wherein the temperature of the optically active surface during spraying with surface-treatment agent is no less than TG+20 K and no greater than TG+150 K, wherein TG denotes the glass transition temperature.

10. The method according to claim 1, wherein the surface-treatment agent comprises, based on the total mass of the surface-treatment agent, 25 to 65 wt. % water, 30 to 70 wt. % potassium phosphate, 1 to 8 wt. % sodium phosphate and 0.001 to 0.010 wt. % aluminum, wherein the constituents do not add up to more than 100%.

11. The method according to claim 1, wherein the surface-treatment agent comprises, based on the total mass of the surface-treatment agent, 25 to 65 wt. % water.

12. The method according to claim 11, wherein the temperature of the optically active surface during spraying with surface-treatment agent is no less than TG and no greater than TG+150 K, wherein TG denotes the glass transition temperature of the soda-lime glass.

13. The method according to claim 11, wherein the temperature of the optically active surface during spraying with surface-treatment agent is no less than TG+20 K and no greater than TG+150 K, wherein TG denotes the glass transition temperature of the soda-lime glass.

14. The method according to claim 1, wherein the surface-treatment agent comprises, based on the total mass of the surface-treatment agent, 30 to 70 wt. % potassium phosphate.

15. A method of producing a headlight lens, the method comprising:
provibing a heated blank made of soda-lime glass;
providing a solvent;
providing a solid;
providing a gas;
dissolving the solid in the solvent;
then generating a sulfur-comprising spray mist by thoroughly mixing the solvent with the gas;
providing a first mold;
providing at least a second mold;
providing a cooling path;
press-molding the heated blank to form a headlight lens having at least a first optically active surface using the first mold and the at least second mold;
spraying the first optically active surface with the spray mist; and
cooling the headlight lens in accordance with a cooling regime in the cooling path with addition of heat.

16. The method according to claim 15, wherein the surface-treatment agent comprises water.

17. The method according to claim 15, wherein the surface-treatment agent comprises, based on the total mass of the surface-treatment agent, 25 to 65 wt. % water.

18. The method according to claim 17, wherein the temperature of the optically active surface during spraying with surface-treatment agent is no less than TG+20 K and no greater than TG+150 K, wherein TG denotes the glass transition temperature of the soda-lime glass.

19. The method according to claim 18, wherein the surface-treatment agent forms droplets, of which the average diameter is no greater than 50 μm.

20. The method according to claim 19, wherein the optically active surface is sprayed for no longer than 4 seconds.

21. A method of producing an optical element, the method comprising:
heating a blank made of glass;
providing a surface-treatment agent which comprises a solvent and a solid dissolved in the solvent, wherein the solid comprises at least one solid from the group consisting of fatty-acid aluminum salts and phosphate;
providing compressed air;
providing a mixing nozzle;
generating a spray mist using the mixing nozzle to mix the surface-treatment agent with the compressed air;
providing a first mold;
providing at least a second mold;
press-molding the heated blank to form an optical element having a first optically active surface using the first mold and the at least second mold;
spraying the at least first optically active surface with the spray mist; and
cooling the optical element in accordance with a cooling regime with addition of heat.

22. The method according to claim 21, wherein the temperature of the optically active surface during spraying with surface-treatment agent is no less than TG+20 K and no greater than TG+150 K, wherein TG denotes the glass transition temperature of the glass.

23. The method according to claim 22, wherein the surface-treatment agent comprises, based on the total mass of the surface-treatment agent, 25 to 65 wt. % water, 30 to 70 wt. % potassium phosphate, 1 to 8 wt. % sodium phosphate and 0.001 to 0.010 wt. % aluminum, wherein the constituents do not add up to more than 100%.

24. The method according to claim 22, wherein the surface-treatment agent comprises, based on the total mass of the surface-treatment agent, 25 to 65 wt. % water.

25. The method according to claim 22, wherein the surface-treatment agent comprises, based on the total mass of the surface-treatment agent, 30 to 70 wt. % potassium phosphate.

26. The method according to claim 23, wherein the surface-treatment agent forms droplets in the spray mist, of which the average diameter is no greater than 50 μm.

27. The method according to claim 26, wherein the optically active surface is sprayed for no longer than 4 seconds.

28. The method according to claim 21, wherein the solid comprises fatty-acid aluminum salts.

\* \* \* \* \*